(12) United States Patent
Brostmeyer et al.

(10) Patent No.: US 9,604,756 B1
(45) Date of Patent: Mar. 28, 2017

(54) PROCESS FOR TESTING A COMPRESSOR OR A COMBUSTOR OF A GAS TURBINE ENGINE USING A LARGE COMPRESSED AIR STORAGE RESERVOIR

(71) Applicants: Joseph D Brostmeyer, Jupiter, FL (US); Robert L Memmen, Stuart, FL (US)

(72) Inventors: Joseph D Brostmeyer, Jupiter, FL (US); Robert L Memmen, Stuart, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 0 days.

(21) Appl. No.: 15/200,057

(22) Filed: Jul. 1, 2016

Related U.S. Application Data

(60) Division of application No. 14/934,219, filed on Nov. 6, 2015, now Pat. No. 9,410,869, which is a continuation-in-part of application No. 14/008,308, filed as application No. PCT/US2012/029231 on Mar. 15, 2012, now Pat. No. 9,200,983.

(60) Provisional application No. 61/468,771, filed on Mar. 29, 2011, provisional application No. 61/561,956, filed on Nov. 21, 2011, provisional application No. 61/587,022, filed on Jan. 16, 2012.

(51) Int. Cl.
| | |
|---|---|
| *G01M 15/14* | (2006.01) |
| *B65D 19/16* | (2006.01) |
| *F02C 6/16* | (2006.01) |
| *G01M 17/007* | (2006.01) |
| *G01M 9/02* | (2006.01) |

(52) U.S. Cl.
CPC ............. *B65D 19/16* (2013.01); *F02C 6/16* (2013.01); *G01M 9/02* (2013.01); *G01M 15/14* (2013.01); *G01M 17/007* (2013.01)

(58) Field of Classification Search
CPC ............ F02C 6/16; F05D 2260/83; F23R 2900/00019; G01M 15/14; G01M 17/007; G01M 9/02
USPC ........................................ 73/112.01
See application file for complete search history.

(56) References Cited

U.S. PATENT DOCUMENTS

| | | | | | |
|---|---|---|---|---|---|
| 4,312,179 | A | * | 1/1982 | Zaugg ............... | F02C 6/16 60/774 |
| 5,537,822 | A | * | 7/1996 | Shnaid ............... | F02C 6/04 60/650 |
| 5,934,063 | A | * | 8/1999 | Nakhamkin ........ | F02C 6/06 60/727 |
| 6,745,569 | B2 | * | 6/2004 | Gerdes ............... | F02C 6/16 60/39.183 |

(Continued)

*Primary Examiner* — Freddie Kirkland, III
(74) *Attorney, Agent, or Firm* — John Ryznic

(57) ABSTRACT

A process for testing a combustor of a gas turbine engine, where a large volume of compressed air is stored in a large reservoir of at least 10,000 m$^3$ such as an underground storage cavern, compressed air from the storage reservoir is passed through heat exchanger to preheat the compressed air to a temperature that would normally be discharged from a compressor, the preheated compressed air is burned with a fuel in the combustor, and additional compressed air from the reservoir is passed through an injector located downstream from the combustor to produce a decreased pressure such that a low atmospheric condition at the combustor exit is simulated.

2 Claims, 21 Drawing Sheets

(56) References Cited

U.S. PATENT DOCUMENTS

| | | | | |
|---|---|---|---|---|
| 7,401,505 B1* | 7/2008 | Schultz | G01M 9/04 | 73/147 |
| 7,500,349 B2* | 3/2009 | Althaus | F01D 25/305 | 60/39.511 |
| 7,614,237 B2* | 11/2009 | Nakhamkin | F01D 15/10 | 60/39.183 |
| 7,810,384 B2* | 10/2010 | Ono | F01D 25/285 | 73/112.01 |
| 8,011,189 B2* | 9/2011 | Nakhamkin | F02C 6/16 | 60/39.183 |
| 8,261,552 B2* | 9/2012 | Nakhamkin | F01K 3/12 | 60/659 |
| 8,341,964 B2* | 1/2013 | Finkenrath | F02C 6/16 | 60/727 |
| 8,689,566 B1* | 4/2014 | Coney | F01K 23/103 | 60/39.5 |
| 8,726,629 B2* | 5/2014 | Coney | F01K 23/103 | 60/39.5 |
| 8,739,522 B2* | 6/2014 | Anikhindi | F02C 1/04 | 60/327 |
| 8,984,893 B2* | 3/2015 | Schroder | F02C 6/16 | 60/772 |
| 9,200,983 B2* | 12/2015 | Brostmeyer | G01M 15/14 | |
| 2004/0148922 A1* | 8/2004 | Pinkerton | F02C 1/05 | 60/39.6 |
| 2009/0100835 A1* | 4/2009 | Nakhamkin | F01D 15/10 | 60/659 |
| 2009/0178384 A1* | 7/2009 | Nakhamkin | F02C 6/16 | 60/39.183 |
| 2010/0043437 A1* | 2/2010 | Nakhamkin | F01D 15/10 | 60/645 |
| 2010/0083660 A1* | 4/2010 | Nakhamkin | F02C 6/16 | 60/652 |
| 2010/0251712 A1* | 10/2010 | Nakhamkin | F01K 3/12 | 60/659 |
| 2011/0094236 A1* | 4/2011 | Finkenrath | F02C 6/16 | 60/772 |
| 2014/0026650 A1* | 1/2014 | Hobelsberger | G01M 15/14 | 73/112.02 |

* cited by examiner

PROCESS FOR TESTING A COMPRESSOR OR A COMBUSTOR OF A GAS TURBINE ENGINE USING A LARGE COMPRESSED AIR STORAGE RESERVOIR

CROSS-REFERENCE TO RELATED APPLICATIONS

This application is a Divisional Application of U.S. patent application Ser. No. 14/934,219 filed Nov. 6, 2015 and entitled PROCESS FOR TESTING A COMPRESSOR OR A COMBUSTOR OF A GAS TURBINE ENGINE USING A LARGE COMPRESSED AIR STORAGE RESERVOIR; which is continuation-in-part of and claims priority to U.S. patent application Ser. No. 14/008,308, filed Nov. 13, 2013, entitled APPARATUS AND PROCESS FOR TESTING AN INDUSTRIAL GAS TURBINE ENGINE AND COMPONENTS THEREOF, which application is a National Stage entry under 35 U.S.C. §371 of and claims priority to International Application No. PCT/US2012/029231, filed Mar. 15, 2012, which application is related to and claims priority to U.S. Patent Application Ser. No. 61/468,771, filed Mar. 29, 2011, U.S. Patent Application Ser. No. 61/561,956, filed Nov. 21, 2011, U.S. Patent Application Ser. No. 61/569,378, filed on Dec. 12, 2011, U.S. Patent Application Ser. No. 61/587,022, filed May 16, 2011, U.S. patent application Ser. No. 13/108,029, filed May 16, 2011, and U.S. patent application Ser. No. 13/410,051, filed Mar. 1, 2012, the entirety of all of which is incorporated herein by reference.

GOVERNMENT LICENSE RIGHTS

None.

BACKGROUND OF THE INVENTION

Field of the Invention

The present invention relates generally to an apparatus and a process for testing a component of a gas turbine engine, especially for a large aero gas turbine engine, and for a process for testing a large industrial gas turbine engine that require large flow capacity and pressure ratios.

Description of the Related Art Including Information Disclosed Under 37 CFR 1.97 and 1.98

A large frame heavy duty industrial gas turbine (IGT) engine is typically used to drive an electric generator and produce electrical energy. These engines can produce over 200 MW of electric power. An IGT engine will have a compressor with multiple rows or stages of rotor blades and stator vanes, a combustor with multiple can combustors arranged in an annular array (also referred to as a can annular combustor), and a turbine with multiple rows of rotor blades and stator vanes. An aero engine typically has an annular combustor instead of multiple can combustors arranged in an annular array as in the IGT engines.

The single largest hurdle to introducing new technologies into large frame power generation gas turbine engines or aero engines is the risk that the new technology may fail during operation of the engine and result in tens of millions of dollars in equipment damage and possibly the cost of replacement electricity during the down time of the power plant. Thus, an owner of one of these engines is very reluctant to allow for the use of the engine in testing a new technology. As a result, it is very difficult to introduce new technologies into a utility power generation plant. Therefore most power generation manufacturers have test facilities to test as much as possible the components prior to going into production. Unfortunately the cost of test facilities and running the tests prohibits extensive testing and usually only allows for infant mortality issues to be discovered prior to installation of a new gas turbine engine at the utility site.

Testing a large IGT engine as a whole or testing a part or component of the engine is both very expensive and very difficult and complex. When a large engine is tested, the power generated must be dissipated. One method of dissipating the energy produced is to drive an electric generator and dump the electrical power produced. The excess electrical power produced during testing can be supplied back into the electrical grid. However, this can become a real problem with the electric power company. Since the engine testing might only last for a few hours, supplying this large amount of electricity to the grid for a few hours and then stopping causes real problems with the power company, especially if the power suddenly stops due to a problem during the test which trips the gas turbine engine offline.

Another problem with testing aero engines or large frame engines is that the cost to test is very high. In some IGT engine test beds, instead of using an electric generator to supply the resistance load, a water break or electrical heater resistors can be used to dissipate the load produced by the engine. These means of dissipating the load has advantages over the electrical power production described above in that the disturbance to the electrical grid is not produced. However, the disadvantage is that all of the energy produced is lost.

In a power plant that uses an IGT engine to drive a generator and produce electrical power, the electrical power required by the local community cycles from high loads (peak loads) to low loads such as during cool days or at night. One process to match electric supply with demand of an electrical power plant is to make use of compressed air energy storage (CAES) system. At low loads, instead of shutting down an engine, the engine is used to drive a compressor instead of an electric generator to produce high pressure air that is then stored within an underground cavern such as a salt mine cavern. A large amount of compressed air is collected and then used to supply the engine during the peak loads.

When testing a gas turbine engine such as a large industrial engine or an aero engine or a component of one of these engines, the engine or component needs to be tested at different operating condition other than just the steady state condition. Engine partial load conditions must be tested for and therefore requires different fuel and compressed air flows. Also, the loads on the engine vary during the testing process from a full load at the steady state condition to partial loads. Thus, the amount of energy dissipated varies during the engine testing process.

Testing of a component of a large frame heavy duty industrial gas turbine engine is also required. Each of the components of an engine requires testing. The compressor, the combustor or the turbine can be tested as a separate unit from the engine. For example, in the testing of a combustor, a large volume of compressed air at high pressure (15-100 bars) is required to be supplied to the combustor to be burned with a fuel for testing. One or more compressors are required to produce this large volume of compressed air. Thus, a large electric motor with a power output of 20-200 MW and over is required to drive the compressor or compressors. Thus, testing of combustors requires a large capital expense and maintenance requirements.

When a component of a large industrial or aero gas turbine engine is to be tested, such as a combustor module or a turbine module or a compressor module, the entire engine is operated just to test that one component module. The entire engine is required to be operated in order to produce the conditions required to test that component module. Thus, it is very costly to test a single component module in a gas turbine engine when the entire engine is to be operated. Also, during operation of the gas turbine engine for testing one of the component modules such as a turbine module, a load is connected to the turbine in order to create a resistance during the testing process. As described above in the entire engine testing process, this load is typically lost or difficult to dissipate.

In testing of a compressor module, the compressed air produced during the testing process is wasted due to the high cost of storing the compressed air for future use. Thus, the energy produced in the testing process of a compressor module is also wasted.

An airfoil that requires a high Mach number of air flow for testing is typically supplied with compressed air from a compressed air storage tank that is relatively small and very heavy in construction to withstand the high pressures. Because of the limited size of the compressed air tank, the testing period is on the order of a few seconds which limits the accuracy of the test data and the types of data that can be measured.

Recently, several gas turbine Original Equipment Manufacturers (OEM's) have indicated a need for combustion research capability that far exceeds the flow capacity and pressure ratios of existing facilities. This requirement for new combustion research facilities is motivated in the first instance by the need to design more environmentally benign gas turbines producing much reduced greenhouse gas emissions using hydrogen or, in the interim, blended hydrogen fuels. This requirement coincides with the rust-out of existing OEM combustion research facilities and the need to relocate existing facilities away from urban areas.

There is a pressing market requirement for a combustion research facility having significantly increased air mass flow rate and compression ratios than currently exist. The combustion research capacity and capability sought is necessary for next generation industrial gas turbines that will employ much higher pressure ratios than today's engines and will burn a variety of gaseous and liquid fuels with ever reducing greenhouse gas emissions. Hydrogen produced from environmentally benign coal gasification is a key green target for the US government, based on extensive USA coal reserves and energy security agenda.

The National Research Council Institute for Aerospace Research (IAR) Gas Turbine Laboratory (GTL) already performs similar combustion research and technology demonstration. GTL R&TD is on both conventional and alternative fuels but at lower pressure ratios and air mass flow rates than are required for future technology development, demonstration and validation. The minimum facility air mass flow rate and operating pressure ratio that would be sufficient for this facility would be 150 lb/sec at a pressure ratio of 60:1. This requires a compressor drive power of 80 MW although redundancy would be a highly desirable facility attribute. The Compressor Institute design standard dictate that no more than 40 MW of compressor capacity be driven by one shaft. This means that at least two 40 MW gas turbines would be required, however, it may be prudent to use more than two drive gas turbines to enable cost effective delivery of less than one engine size class. This size test facility is estimated to cost around $200 Million. A more desirable facility capacity would provide 300-550 lb/sec of air at a minimum pressure ratio of 60:1, but would require a compressor drive capacity of around 150 MW. A full capacity facility would deliver 550 lb/sec of air at the 60:1 pressure ratio, but with a capital investment in excess of $600 Million.

Transient blow down testing is a technique that has been used for many years in aerospace testing. This technique is used to reduce the size and cost of compression and vacuum pumps required to develop the conditions required for a test. For example, a compressor can be run for days or longer to fill a tank to very high pressure and/or a vacuum chamber to very low pressure. The gas is then released for testing. Depending on the mass-flow required during the test, the actual test time can vary from milliseconds up to many minutes. While the cost of the compression and vacuum equipment is kept low using the blow down facility idea, the cost of the pressure and vacuum tanks become very large. NASA Langley has some of the largest high pressure tanks available for testing to create very high Mach number flows.

BRIEF SUMMARY OF THE INVENTION

An apparatus and process for testing a large aero or industrial gas turbine engine or a single component of an engine, where the engine testing facility is established close to a compressed air energy storage (CAES) facility or to an underground cavern that can store compressed air so that the engine during testing can supply the underground compressed air storage reservoir with compressed air, or the underground compressed air storage reservoir can supply the engine or component module testing facility with compressed air for the testing of an engine or an engine component module such as a compressor module or a combustor module or a turbine module.

For testing of an IGT engine, the turbine is connected to drive a compressor so that the load from the engine during testing is used to drive the compressor to produce compressed air that is then stored within the storage cavern or CAES facility for use in peak power production later or for other engine testing requirements. Thus, no disruption to the electric grid is produced, and no energy from the engine testing is wasted. Compressed air from the storage cavern or CAES facility can be burned with a fuel to produce the hot gas stream for testing within the turbine, and the turbine can be used to drive a compressor to resupply the storage cavern or CAES facility for later use.

In the testing of a single engine component, such as a combustor or a turbine, the large volume and high pressure compressed air can be supplied from the CAES facility or storage cavern for use in testing the component. Therefore, a large capital investment in equipment and a building is not required since the infrastructure already exists at the CAES power plant.

Because of the use of an underground CAES facility or storage cavern for the supply of compressed air for testing the IGT engine or component module, a much smaller compressor is required for producing the compressed air than in the prior art engine test facilities. If a CAES facility is not available, the engine or component module testing CAES facility can be located near to an underground cavern (such as a salt dome) or large geologic cavern that can be used to store the compressed air. The compressor can be one-tenth of the size normally required to supply this large of a volume of compressed air since the smaller compressor can be operated for a longer period of time (for example 72 hours) to supply the required volume and pressure of compressed air in the reservoir of the CAES or testing CAES facility. Thus, the cost of equipment will be much lower since the larger and costlier compressor is not required to produce this large of a volume and pressure of compressed air for the testing process. The storage caverns facility can also be used to store gaseous fuels such as $CH_4$ or $H_2$ in the underground cavern or mine such as an old salt mine.

A high Mach number test can also be performed using the CAES facility or storage cavern to store a vacuum (a negative pressure in relation to atmospheric pressure) within one of the caverns or mines. The large volume of low pressure (vacuum) air can be used to vary a downstream pressure for the high Mach number testing of vehicles or engines in a wind tunnel with a low capital equipment cost. The testing facility can be connected to a high pressure cavern upstream and to a negative pressure cavern downstream in order to produce a very high pressure differential for the test facility in order to test an aero component. Or, instead of a vacuum chamber the lower pressure at the outlet of the test object can be subjected to an ejector using the compressed air from the underground storage reservoir to produce a lower pressure.

For testing an industrial or aero gas turbine engine, the engine is connected to drive multiple compressors each producing different pressures and each being connected to a separate underground reservoir to hold the compressed air at different pressures. One reservoir might be used to store relatively low pressure compressed air, a second reservoir might be used to store medium pressure compressed air, and a third reservoir might be used to store relatively high pressure compressed air. When a testing phase requires a certain pressure of air, the reservoir with the minimum pressure can be used instead of wasting pressurized air that requires decreasing of the pressure.

The cost of the storage volume has always limited the test time available from blow down tests and mass-flow rate during the test time. The prior art has always been to use relatively small manmade tanks for storing the high pressure air or the vacuum. Prior art low pressure storage tanks exist of around 50 meters in diameter that can store a low pressure gas. For high pressure gases, a cylinder tank made of carbon fiber of about 36 inches in diameter can store up to 200 bar of pressurized gas. The present invention is to use a manmade solution mined cavern to form a very large underground cavern to store highly compressed air for aerospace and gas turbine engine testing or component module testing. A geographic salt dome cavern can be thousands of time larger than the largest manmade tank and built using solution mining at a small fraction of the cost. The use of a single or multiple salt dome caverns or similar geographic cavern to store and release gases to and from a series of different cavern pressures can significantly reduce the cost of aerodynamic wind tunnel and gas turbine engine or component module testing. The caverns can be mined at various depths to be best adapted to meeting the storage pressure range requirement of a particular cavern. In addition, flow conditions previously thought unaffordable therefore never previously available to the industry for testing can now become part of the standard test protocol.

The underground compressed air storage reservoir and the test facility for testing a gas turbine engine or a component of an engine includes a non-vitiating heat exchanger to preheat the compressed air from the reservoir to produce non-vitiated compressed air for use in a test component such as a combustor in order to more accurately test the component. The heat exchanger can be electric or use fuel and air to produce a hot gas that does not mix with the compressed air from the reservoir in order to preheat the compressed air to the required temperature and pressure for testing the component without decreasing the oxygen content of the compressed air.

In another embodiment of the present invention, the non-vitiating heater can be replaced with an air turbine that is driven by compressed air from the underground storage reservoir, where the air turbine drives a real compressor that will produce the required compressed air at the design pressure and temperature that is burned with a fuel in a combustor for testing of the combustor. A compressor can also be tested with this design in that the air turbine is used to drive the compressor during the testing phase.

DETAILED DESCRIPTION OF THE INVENTION

Figure 1:
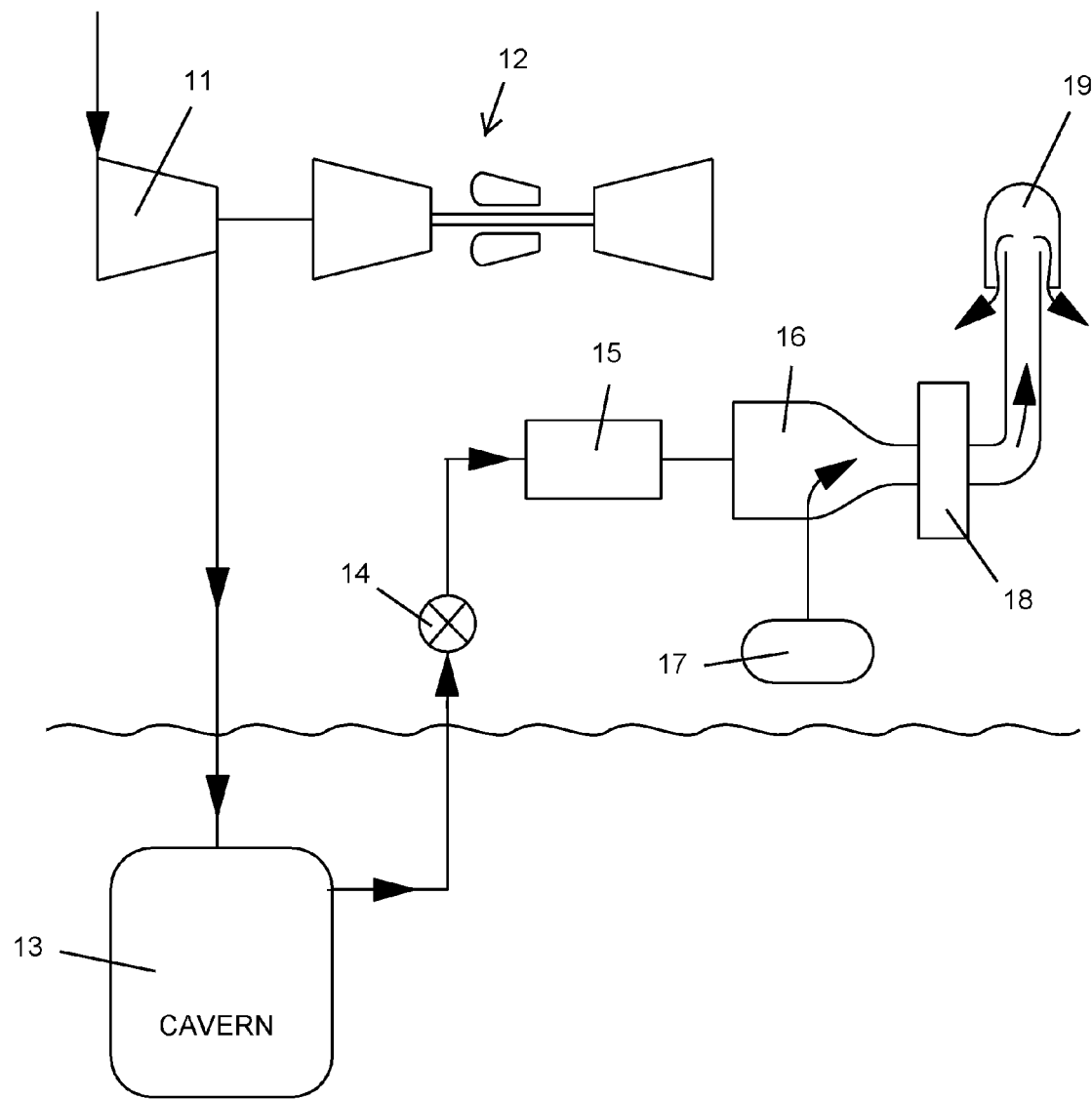
FIG. 1 shows a schematic view of a large gas turbine engine test facility using an underground compressed air reservoir of the present invention.

A test facility and a process for testing a turbine or combustor component module for an industrial or aero gas turbine engine is shown in FIG. 1 in which compressed air stored within a large underground cavern is used to supply the high flow rate and pressure required for testing an engine or component module under normal engine operating conditions. The engine or component module test facility includes a small compressor 11 (small in relation to the compressor used on the actual gas turbine engine in which the combustor is being tested), an electric motor (or a gas or diesel powered engine can be used) or a small gas turbine engine 12 to drive the compressor 11, an underground compressed air storage reservoir 13 to store compressed air from the compressor 11, an air pressure regulator valve 14 to control the pressure released from the underground compressed air storage reservoir 13, an air heater 15 to heat the compressed air flowing from the reservoir 13 to a temperature that would normally be passed into the combustor of the actual engine, a fuel source 17 such as natural gas to be burned with the compressed heated air, a combustor 16 that is to be tested, a hot exhaust gas cooler 18 to cool the hot exhaust gas from the component that is being tested, and an exhaust and silencer 19 to discharge the combustor exhaust. The heater 15 is a non-vitiating heater that will produce heated compressed air at a proper temperature for testing in which the oxygen content is at a normal range for atmospheric air.

The compressed air storage reservoir 13 can be a pre-existing underground storage facility such as an emptied salt cavern, or can be formed from a salt mine using a solution to create a cavity within the salt mine capable of storing compressed air for engine or component module testing. Or, if the engine testing facility is located at a CAES facility, the storage reservoir for the CAES facility can be used as the compressed air source for the engine or engine component testing. The storage reservoir 13 must be capable of storing enough compressed air at a high pressure and high flow rate so that the combustor can be properly tested. The smaller compressor 11 can be much smaller (such as around one-third the size of one of the larger compressor used in the prior art test facilities. Instead of a compressor that cost $10-100 Million, the smaller compressor used in the present invention would only cost around $1-10 Million. Also, since the storage tank 13 can be filled over a long period of time, the smaller compressor 11 can be operated for several days to fill the reservoir 13 with enough compressed air for the next test to be performed.

The pressure regulator valve 14 controls the release of the compressed air from the storage reservoir 13 that will flow into the combustor 16 or test article for testing. Because the compressed air released from the storage reservoir 13 is relatively cold air, the air heater 15 will heat the compressed air to the normal temperature that would be discharged from a required temperature for testing of the combustor or the turbine or other component that is to be tested. Using a fuel to directly heat the compressed air would supply heated compressed air but at a lower oxygen content.

The test facility of the present invention can be used to test combustors of modern day engines that use the can-annular combustor or the annular combustor or silo combustors. Aero engines typically use an annular combustor while industrial engines use an annular arrangement of can combustors commonly referred to as a can-annular combustor. In the can-annular and annular combustors, to reduce the requirement of flow for testing, these combustors are tested by using only a small section of the combustor because of the symmetry. However, some error is produced even when testing of only a section of the combustor. To produce a full and accurate test of the combustor, the entire combustor must be tested for flow. For the silo type combustor, this combustor cannot be sectioned so that a portion of the combustor can be flow tested that would represent the entire combustor. To test the silo type combustor or the aero annular combustor, the entire combustor should be flow tested and therefore a high flow rate is required. With the tremendous storage capability of the underground storage reservoir system of the present invention, full testing of the combustors of any type can be performed using the required high flow rates and pressures without the high cost of the large compressors used in the prior art engine testing facilities and at much longer testing periods.

The combustor testing can be performed without burning a fuel in the combustor, or can be tested under normal operating conditions by burning the fuel as normal within the combustor by injecting the fuel through the injectors and into the combustor to be burned with the compressed air from the storage tank 13.

With the combustor test facility of the present invention, even an older combustor from an older engine can be tested in order to improve the combustor performance. The older engines that used the silo type or annular type combustor would be idea for use with the much lower priced testing facility of the present invention. Modifications to the combustor can be done and then tested at a lower cost such that modernizing these older combustors would be cost effective.

Figure 2:
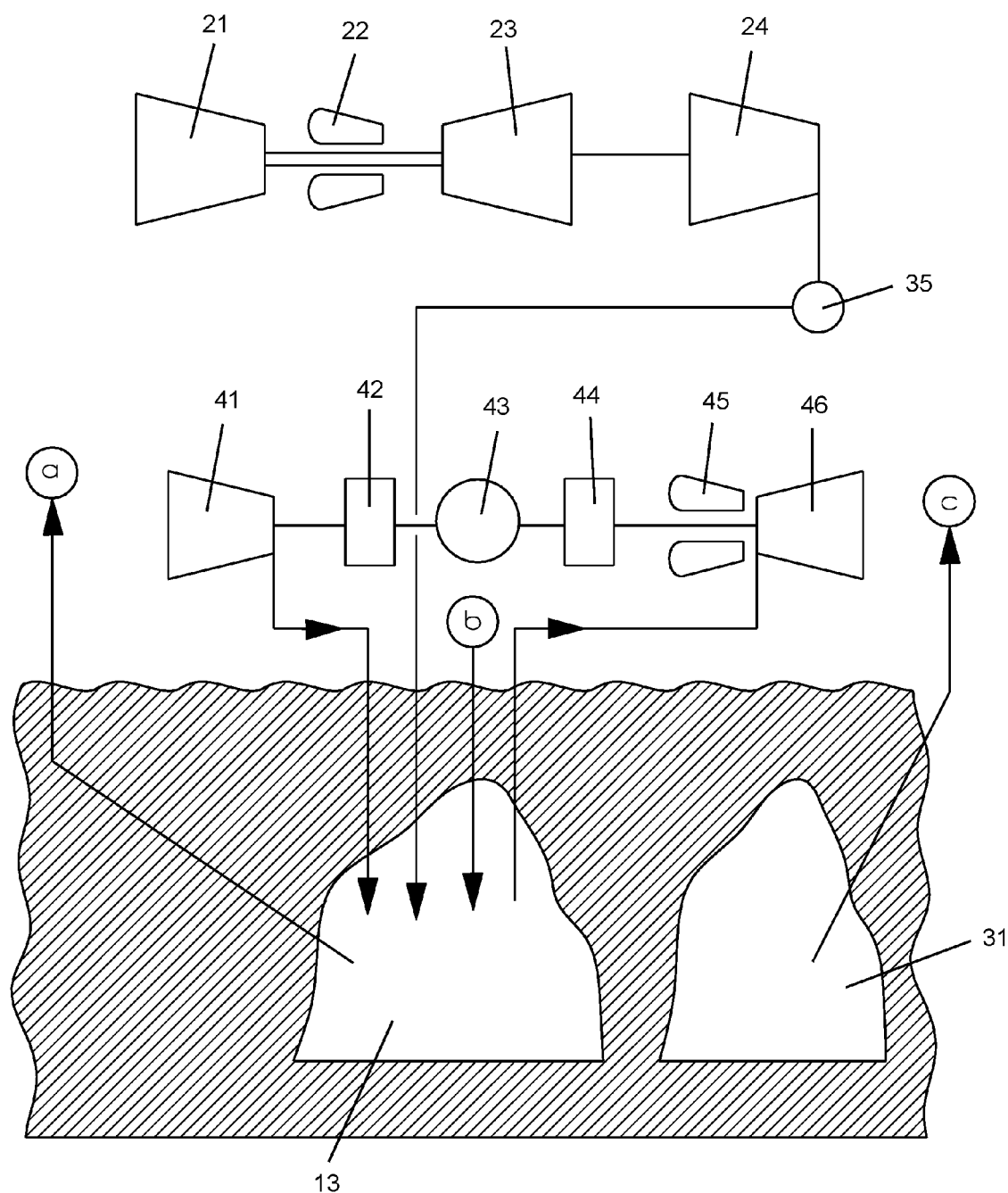
FIG. 2 shows a schematic view of a compressed air energy storage facility with a large frame heavy duty industrial gas turbine engine located nearly for testing of the engine or for testing a component of a gas turbine engine of the present invention.

An apparatus and process for testing a large industrial or aero gas turbine engine or a single component module of an engine, where the engine testing facility is established close to a compressed air energy storage (CAES) facility so that the engine during testing can supply the CAES facility with compressed air, or the CAES facility can supply the engine testing facility with compressed air for the testing of an single engine component is shown in FIG. 2. FIG. 2 shows a CAES facility (includes 41-46) which is located next to a large underground cavern or old salt mine 13 that can be used for storage of compressed air. The test engine includes a large industrial gas turbine engine with a compressor 21, a combustor 22 and a gas turbine 23 to produce mechanical work that is used to drive a compressor 24 to fill the cavern. The compressor 24 provides for a load to the engine during testing. At low demand for electrical power, the power plant can be used to drive a compressor 24 to produce compressed air to be stored within the underground reservoir 13. However, unlike in the prior art, the load is not wasted but converted into compressed air for storage in the reservoir 13. At peak demand, the stored compressed air is then supplied to the power plant for later use. Air line (a) represents compressed air being discharged from the reservoir while air line (b) represents compressed air being delivered to the reservoir 13. Air line (c) represents a lower pressure air such as from a vacuum or an ejector. A valve 35 is used to prevent compressed air from discharging from the reservoir 13 and back out through the compressor 24.

An IGT engine testing facility is located adjacent to the CAES facility (or cavern) so that the load from the engine that is being tested can be used to produce compressed air for storage in the CAES facility, and the CAES facility can be used to supply compressed air (or a vacuum) to the engine testing facility. With this association, the overall efficiency of both the engine testing facility and the CAES facility will be improved. A lower pressure can be produced using a storage reservoir with a vacuum or a storage reservoir with compressed air connected to an ejector that will be described below in more detail.

For testing of an IGT engine (FIG. 2), the gas turbine 23 is connected to drive a compressor 24 so that the load from the engine during testing is used to drive the compressor 24 to produce compressed air that is then stored within the CAES facility for use in peak power production later or for other engine testing requirements. Thus, no disruption to the electric grid is produced, and no energy from the engine testing is wasted. Compressed air from the CAES facility can be burned with a fuel to produce the hot gas stream for running the CAES plant or for testing within the turbine, and the turbine can be used to drive a compressor to resupply the CAES facility for later use.

Another benefit of the testing facility of FIG. 2 for large engines using the compressed air energy storage reservoir 13 is that the reservoir 13 functions as a load damper in the case when the gas turbine engine trips.

The air storage reservoir 13 can be made very large in order to allow for a large industrial or aero gas turbine engine to be tested for a long period of time such as a few days and thus store the energy as compressed air. The compressed air produced during this long period of testing can then be used for process generation or other industrial applications in addition to power generation.

Also seen in FIG. 2, the CAES testing facility can also include an electric motor/electric generator 43 to drive a compressor 41 through a clutch 42 to resupply the reservoir 13 with compressed air. Or, the compressed air stored within the reservoir 13 can be used to drive a turbine 46 thru a clutch 44 which drives the electric generator 43 to produce electrical energy. An optional combustor 45 can be used to burn the compressed air from the reservoir with a fuel and produce a hot gas stream that is then passed through the turbine 46 to produce electric energy from the generator 43.

Figure 3:
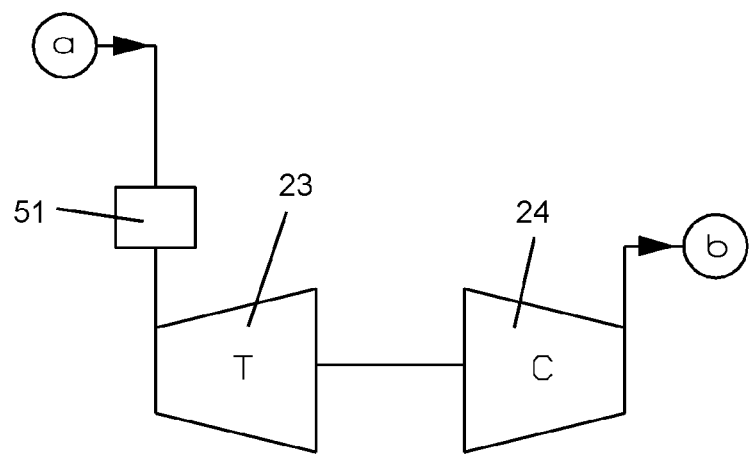
FIG. 3 shows a schematic view of a turbine component of an engine for testing according to the present invention.
Figure 4:
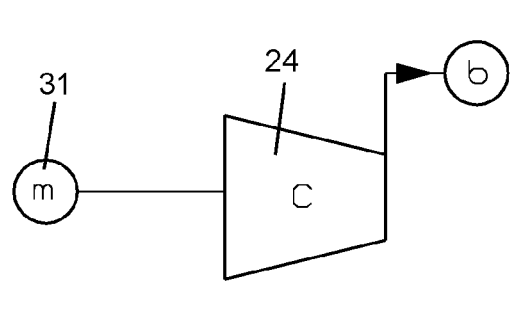
FIG. 4 shows a schematic view of a compressor component of an engine for testing according to the present invention.
Figure 5:
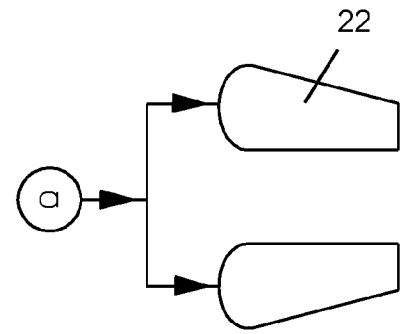
FIG. 5 shows a schematic view of a combustor component of an engine for testing according to the present invention.

In the testing of a single engine component, such as a gas turbine in FIG. 3 or a compressor in FIG. 4 or a combustor in FIG. 5, the large volume and high pressure compressed air can be supplied from the storage reservoir 13 of the CAES facility for use in testing these large gas turbine engine components or as a load on the test article such as the compressor 24 that can resupply the storage reservoir 13. Therefore, a large capital investment in equipment and a building is not required since the infrastructure already exists at the CAES power plant. In FIG. 3, compressed air from the storage reservoir 13 is used to drive the gas turbine 23 for testing. An optional combustor can also be used to produce the hot gas stream and passed through the turbine to recreate a normal operating condition. A compressor 24 driven by the gas turbine 23 during testing can be used to provide a load on the turbine 23 during testing that will also produce compressed air that can be resupplied to the reservoir 13. A heat source 51 can be used to heat up the compressed air coming from the cavern 13. Compressed air from the reservoir can be used to drive an air turbine 23 that then drives the compressor 24 that will produce compressed air at a high pressure and a high temperature for testing a combustor 22 with the proper pressure and temperature of the compressed air without having to heat the compressed air from the reservoir 13. This design will eliminate the need for a non-vitiating heater.

In FIG. 4, a compressor is tested under normal operating conditions for a long period of time. The compressor is driven by a motor, such as an electric motor 31, and compresses air that is then stored within the compressed air storage reservoir 13. In FIG. 5, a combustor is tested using compressed air from the storage reservoir 13. Fuel is mixed and burned with the compressed air within the combustor for the test process.

Because of the use of an underground CAES facility for the supply of compressed air for testing the IGT or aero engine or components, a much smaller compressor is required for producing the compressed air than in the prior art engine test facilities. The compressor can be one-third of the size normally required to supply this large of a volume of compressed air since the smaller compressor can be operated for a longer period of time (for example 72 hours) to supply the required volume and pressure of compressed air in the reservoir 13 of the CAES facility. Thus, the cost of equipment will be much lower since the larger and costlier compressor is not required to produce this large of a volume and pressure of compressed air for the testing process.

The CAES facility can also be used to store gaseous fuels such as $CH_4$ or $H_2$ in the underground cavern or mine such as an old salt mine. The gaseous fuel can be compressed along with air and then used, for example, to test a combustor by passing the compressed air and the fuel into a combustor and ignited. The resulting hot gas stream is then passed through the gas turbine for testing.

Figure 6:
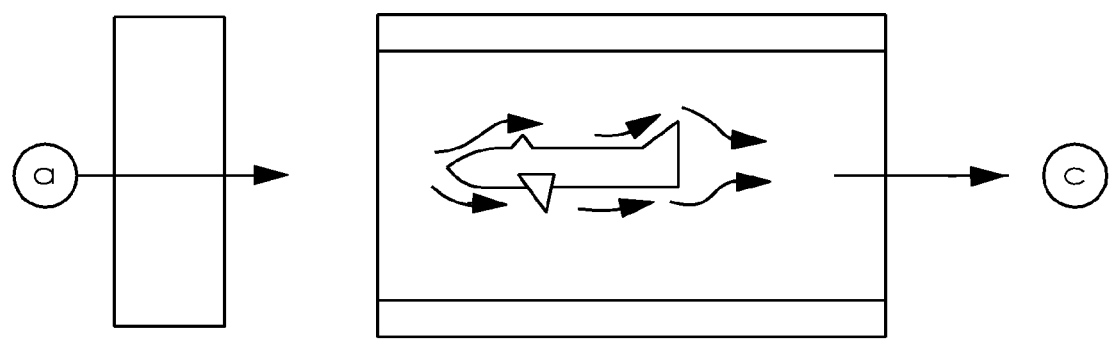
FIG. 6 shows a schematic view of an aero vehicle or aero component within an air tunnel for testing according to the present invention.

A high Mach number test can also be performed using the CAES facility to store a vacuum (FIG. 6) within the cavern or salt mine. The large volume of negative pressure (vacuum) air or from an ejector can be used to vary a pressure for the high Mach number testing of vehicles or engines in a wind tunnel with a low capital equipment cost. A second reservoir can be used to store a vacuum (31 in FIG. 2) that can be used for testing a component in a wind tunnel as seen in FIG. 6. Or, the reservoir storing compressed air can be used to operate an ejector that will produce a lower pressure at the downstream side of the test article. Compressed air can be supplied to an inlet end of the tunnel from the storage reservoir through line (a) and a negative pressure (vacuum) can be supplied on the outlet end from the vacuum reservoir 31 or ejector through line (c). The negative pressure reservoir 31 can be created by using a vacuum pump to draw air out and produce the negative pressure. The vacuum pump can also be small and run for a long period of time to fill the vacuum reservoir 31 with negative pressure for testing purposes. The negative pressure in the vacuum reservoir 31 can also be produced by pumping hydrogen or oxygen into the reservoir 31 and then pumping hydrogen or oxygen into the reservoir to combustor the oxygen and hydrogen mixture to produce water and a very low pressure that results from the conversion of a gas to a liquid. To produce the required low pressure for certain testing, a vacuum pump can then be used to further decrease the vacuum reservoir pressure.

With the present invention, the large amounts of high pressure air required for full scale testing of large components such as a large industrial or aero gas turbine engine can be performed and at lower costs than in the prior art. Also, engine components such as a combustor, a compressor or a gas turbine can also be tested. Full scale aircraft testing can also be performed using a vacuum generated within the CAES facility to produce a high Mach number flow over the vehicle or part. The CAES facility currently operated in McIntosh, Ala. or Huntsdorf, Germany would be an ideal location to locate the large engine test facility of the present invention. However, any large volume underground reservoir from a salt mine or a coal mine could also be used to store high pressure compressed air that could be required for testing of the engine or a single component of an engine. At the McIntosh, Ala. CAES facility, a source of hydrogen production is available and could then be used for testing of hydrogen combustors.

Figure 7:
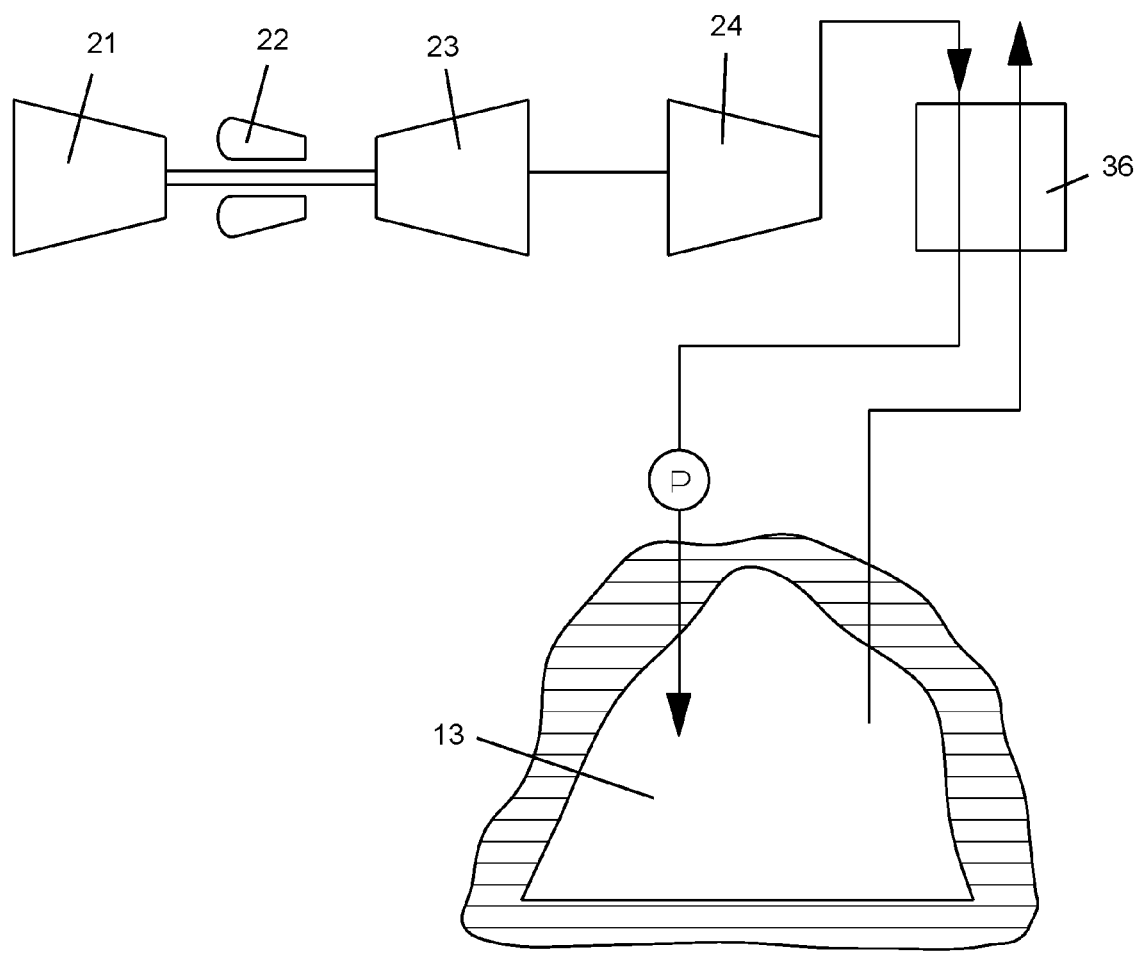
FIG. 7 shows a schematic view of an engine testing facility of the present invention with a thermal heat storage device.

FIG. 7 shows another embodiment of the engine testing facility of the present invention in which a thermal heat storage device 36 is used to store as much of the heat from the hot compressed air produced in the compressor 24 that would pass into the storage reservoir 13 and dissipate therein after time due to heat transfer from the hot air to the cooler walls of the storage reservoir 13. Heat from the hot compressed air is stored and then passed into the colder compressed air that is discharged from the reservoir 13 prior to be used in the testing process.

Figure 8:
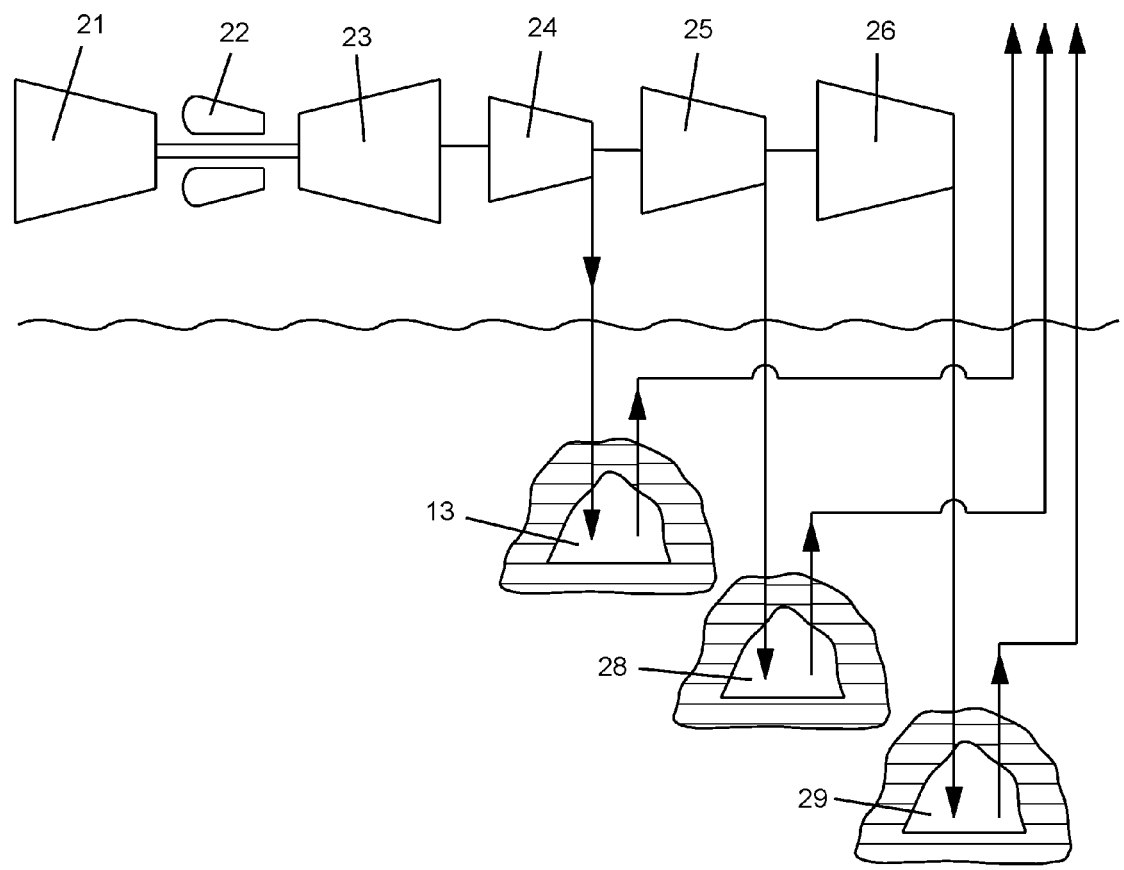
FIG. 8 shows a schematic view of an engine testing facility of the present invention with three separate compressed air reservoirs to hold different pressures of compressed air.

FIG. 8 shows another embodiment of the engine testing facility of the present invention in which multiple compressed air reservoirs are used with each reservoir holding a different pressure. The gas turbine engine (which includes a compressor 21, a combustor 22, and a turbine 23) drives a low pressure compressor 24 and a medium pressure compressor 25 and a high pressure compressor 26. Each of the compressors 24-26 is connected to a separate compressed air storage reservoir. The different pressures are for use in different components or phases of operation of a component or of an engine during all phases of testing. For example, a low pressure reservoir 13 could be used to store compressed air at 5 to 10 bars, the medium pressure reservoir 28 could be used to store compressed air at 10 to 30 bars, and the high pressure reservoir 29 could be used to store compressed air at 50 to 100 bars. The use of the different pressure reservoirs improves the efficient of the testing facility in that high pressure air from the 50 to 100 bar reservoir is not required for use in the low pressure testing component of around 5 bar in which the pressure must be decreased from the high pressure to the low pressure prior to use in the component to be tested. Also, the FIG. 8 embodiment can also be used to produce different loads during the engine testing process. When a low load is required, the engine can be used to drive the low pressure compressor 24. When a high load is required, the engine can be used to drive the high pressure compressor 26. Or, a combination of compressors can be driven at the same time to provide even higher loads to the engine.

In another embodiment of the underground salt mine, a brine solution can be stored and used to drive an electric generator and produce electrical energy. If water was used in a salt cavern, the water would dissolve the salt walls of the cavern and function to melt away the cavern surface. A salt brine solution that is saturated with salt will not dissolve away the salt cavern walls. Also, another advantage our using brine instead of water is that when it is fully saturated with salt it has a specific gravity of 1.2 compared to water, therefore providing 20% more power for the same size equipment. Two caverns are used with different elevations so that a large pressure difference can be used for power production. For example, a first cavern would be located at 500 feet below the surface while a second cavern would be located 1,500 feet below the surface to produce a pressure head equal to 1,000 feet. The saturated salt brine solution could be pumped from the lower cavern during low power demand and into the higher elevation cavern for storage until peak demand. At peak demand, the brine solution can be allowed to flow down and into the lower cavern through a turbine (such as a Francis turbine) that will be used to drive an electric generator and produce electrical energy. Because of the higher specific gravity (compared to water) more power can be extracted from the brine solution.

In another embodiment, instead of a salt cavern with a salt brine solution, a petroleum storage cavern can be used for pressure head to drive the turbine and electric generator. Salt caverns are currently used for the US strategic petroleum reserve. The pumped storage facility could them be used for storage of fluid height potential energy for daily use and chemical energy long term emergencies. The stored fuel or oil in a storage reservoir can be used to drive the turbine and electric generator. Fuel or oil in one reservoir can be pumped to a higher elevation during low demand and then discharged into a lower reservoir through a turbine to drive the electric generator during peak demand.

In another embodiment, the power from a large gas turbine engine during testing could be dissipated and stored by pumping a liquid (such as a brine solution) between two different elevations of caverns. For example, the turbine would be used to drive a pump that will pump a brine solution from a lower level cavern up to a higher level cavern to dissipate the energy being produced by the engine. Then, the brine solution can be passed through another turbine from the higher elevation to the lower elevation to drive the turbine and an electric generator connected to the turbine to produce electrical power. The turbine can be connected to a Francis turbine through a speed reduction gear for pumping the fluid up to the higher elevation cavern or storage reservoir. The same or a second Francis turbine is then used to drive the electric generator when the liquid flows down to the lower elevation cavern.

Figure 9:
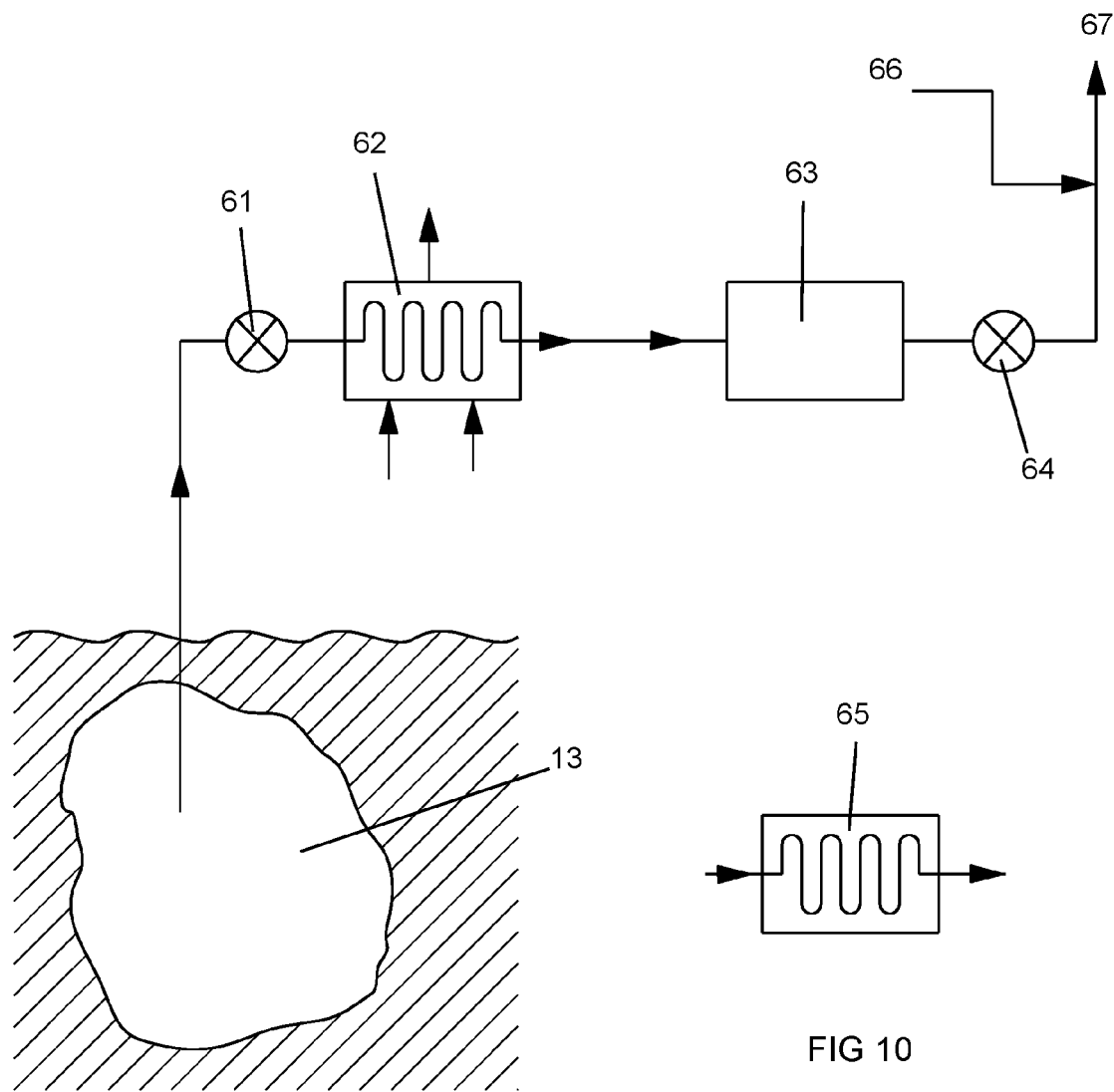
FIG. 9 shows an embodiment of the present invention in which a non-vitiated air heater is used to preheat the compressed air from the cavern prior to entering a test component.

FIG. 9 shows an embodiment of the present invention used to test a component of a gas turbine engine, such as a combustor or a gas turbine using compressed air from the underground cavern or reservoir 13. In order to properly test a component of a gas turbine engine such as a combustor, the compressed air that enters the combustor and is burned with a fuel must enter the combustor at the pressure and temperature that would normally be produced by a compressor operating with the gas turbine engine. Since the compressed air that is to be used for the testing of the combustor is supplied from the cavern 13, this air must be preheated to the desired testing temperature. However, this preheated air must not be burned with a fuel prior to entering the combustor because the compressed air would have less oxygen content than from the compressor of the engine. Thus, a non-vitiated compressed air must be used in which no combustion has occurred. Otherwise, the testing of the combustor would not be a real simulation and thus the results would be unreliable. Therefore, the relatively cool compressed air from the cavern 13 is preheated by a non-vitiating heater 62 that burns a fuel with atmospheric air that is passed over a closed tube in which the compressed air from the cavern is passed in order to transfer heat to the compressed air and produce a hot high pressure compressed air that is then delivered to the test component such as a combustor. With the hot compressed air entering the combustor, a fuel can then be burned to simulate the gas turbine engine and test the combustor under real conditions. A flow control valve 61 is used to control the amount of compressed air delivered from the cavern to the preheater 62. A pressure control valve 64 is used to control the pressure in the test component 63. The exhaust 67 from the test component can be injected with water 66 to cool down the exhaust prior to discharge from the test facility.

Figure 10:
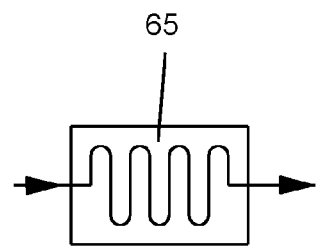
FIG. 10 shows an embodiment of the present invention in which an electric heater is used to preheat the compressed air in the FIG. 9 embodiment.

FIG. 10 shows an electric heater 65 that can be used to preheat the compressed air from the cavern 13 to produce the non-vitiated compressed air for use in the testing component 63 instead of the fuel burning with air.

Figure 11:
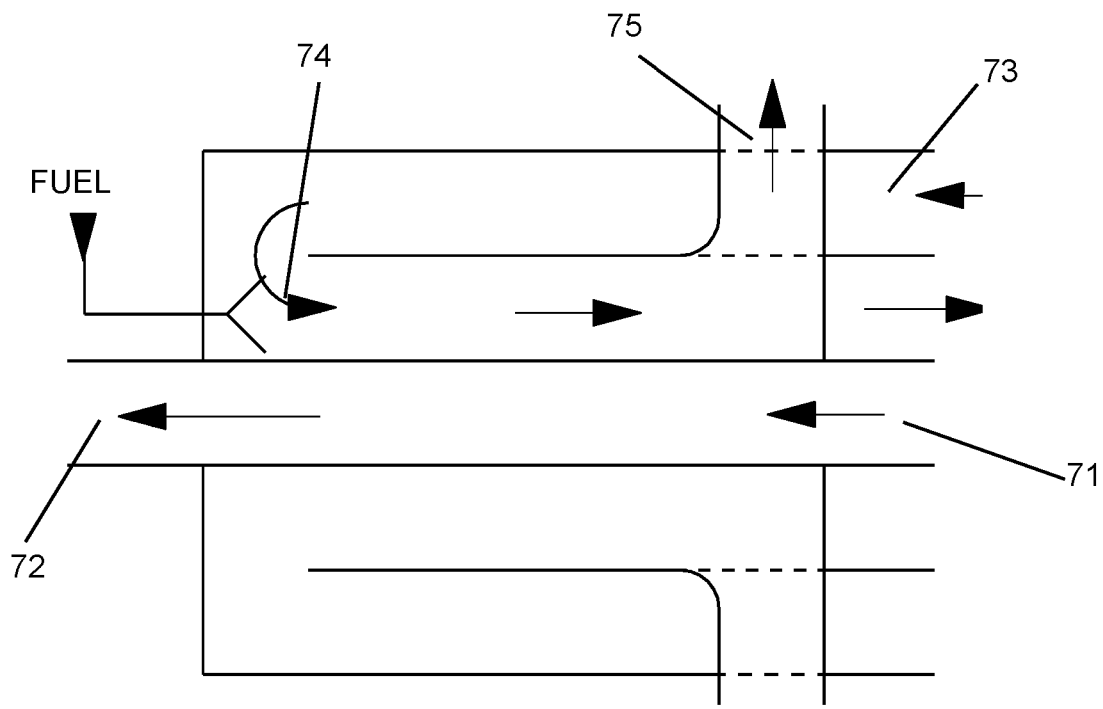
FIG. 11 shows an embodiment of the present invention with a non-vitiated air heater that uses a fuel to preheat the compressed air for the FIG. 8 embodiment.

FIG. 11 shows an embodiment of a non-vitiated compressed air preheater that is used in the present invention of FIG. 9. Compressed air from the cavern 13 at 2,000 psi and 200 degrees F. enters the preheater at 71 and flows toward the exit 72. Compressed air also from the cavern 13 enters a second inlet of the preheater at 2,050 psi and 200 degrees F. at 73 and flows toward a section where a fuel is injected to burn with the second flow of compressed air to produce compressed air at 3,000 degrees F. This hotter compressed air at 3,000 degrees F. is then used to preheat the first flow of compressed air from 200 degrees F. to 2,100 degrees F. that exits the preheater at 72. The second flow is discharged to the atmosphere at 75. The pressures and temperatures displayed for FIG. 11 are for a certain size aircraft engine component but can be at different pressures and temperatures depending upon what component are to be tested.

Figure 12:
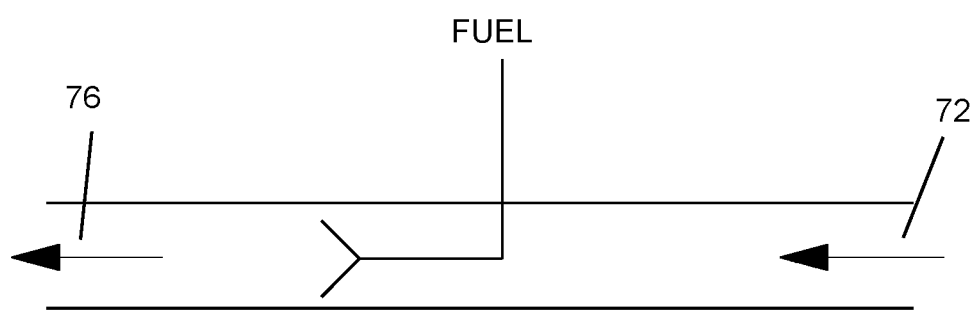
FIG. 12 shows an embodiment of the present invention for a high Mach number test in which the preheated air from the non-vitiated air heater in FIG. 11 is further heated by direct injection of a fuel into the high temperature compressed air.

FIG. 12 shows an embodiment of the non-vitiated compressed air preheater that is used for a test in which the compressed air must be further heated to a temperature such as 2,800 degrees F. After exiting the preheater at 72, the non-vitiated compressed air at 2,100 degrees F. is burned with a fuel to produce a temperature of 2,800 degrees F. at the outlet 76. It is very difficult to heat air past around 1,500 degrees F. with an externally fired heater due to high pressure gradients across the heater tubes and high temperature of the tubes. The test facility of the present invention allows for temperatures of 2,100 degrees F. for non-vitiated air and 2,800 degrees F. for partially vitiated air. Since the flows through 74 and 71 are both at high pressure, the surface area 71/74 of the heat exchanger tubes or tube can be greatly reduced compared to a conventional natural gas heater in which the hot gas is at atmospheric pressure. The tube life is also increased since the pressure gradient across the tube wall is reduced.

Figure 13:
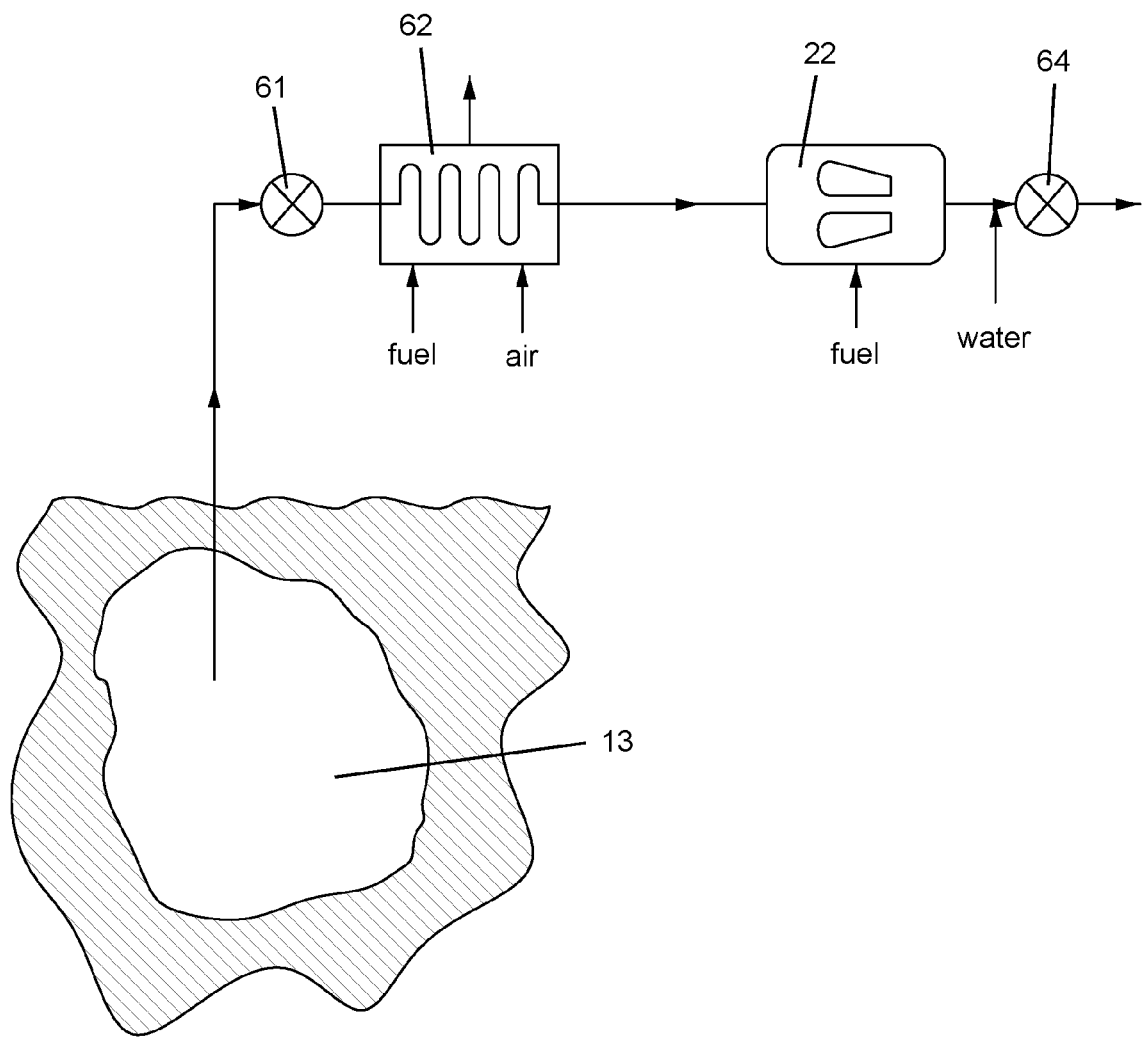
FIG. 13 shows another embodiment of the present invention where compressed air from the storage reservoir 13 is supplied to a heater 62 to produce non-vitiated air that is delivered into a combustor 22.

FIG. 13 shows another embodiment of the present invention where compressed air from the storage reservoir 13 is supplied to a heater 62 to produce non-vitiated compressed air that is delivered into a combustor 22. A pressure regulator valve 61 controls the amount of compressed air delivered from the storage reservoir 13. Fuel and air is burned within the heater 62 to produce a hot gas that is used to heat up the compressed air from the storage reservoir 13 without decreasing its oxygen content so that the compressed air delivered to the combustor 22 is at the temperature and pressure that would normally be discharged from a compressor that would feed to the combustor 22 of the gas turbine engine. The non-vitiated compressed air would have normal oxygen content because no fuel is burned directly within the compressed air. Water can be injected into the exhaust from the combustor 22 in order to cool the hot exhaust prior to discharge to the atmosphere. With the combustor test facility of the present invention, a combustion chamber can be tested at the component level, and at full scale, and for a long duration, and with a low cost compared to that available in the prior art.

Figure 14:
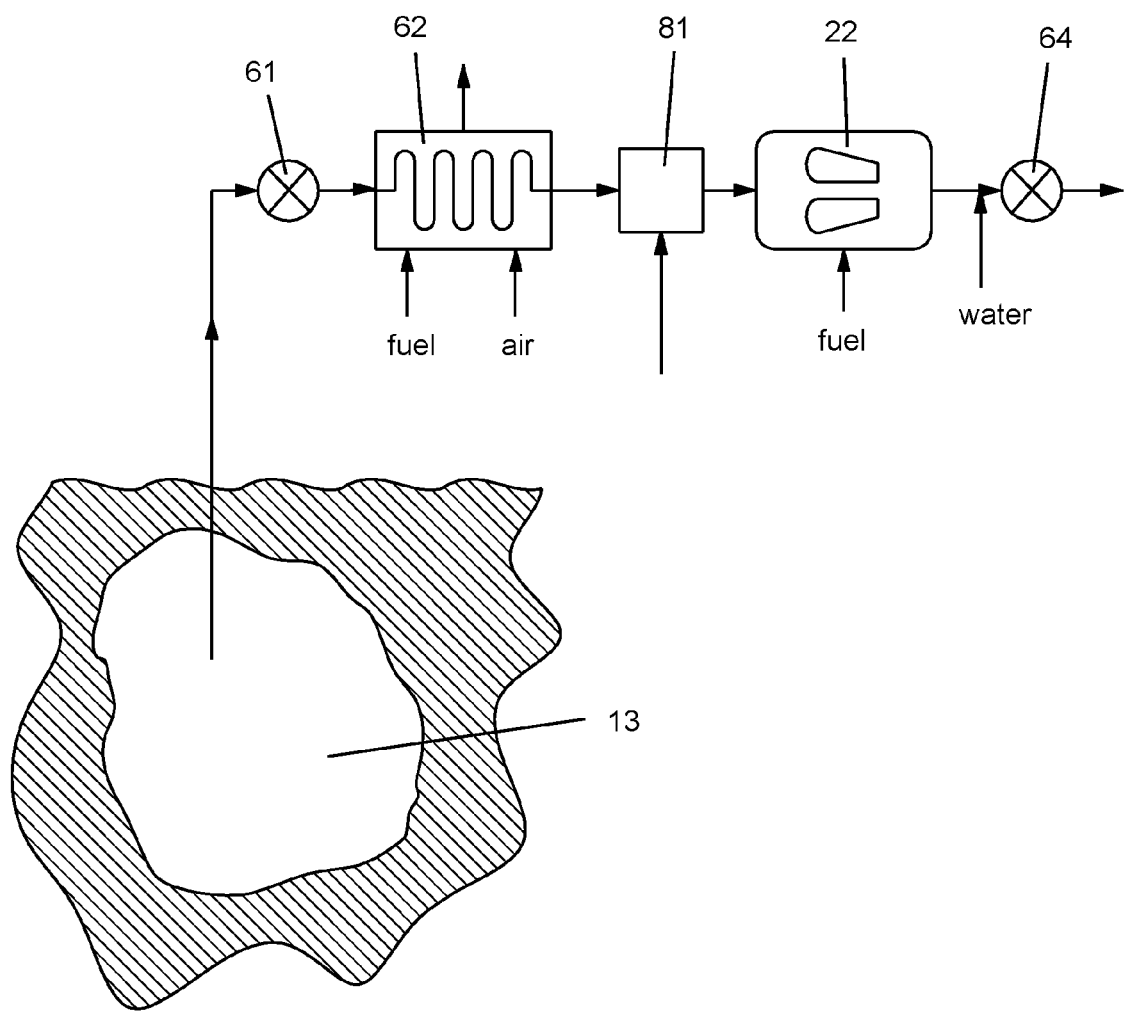
FIG. 14 shows a variation of the test facility of FIG. 13 in which a high Mach number heater 81 is used between the non-vitiated compressed air heater 62 and the combustor 22 that is to be tested.

FIG. 14 shows a variation of the test facility of FIG. 13 in which a high Mach number heater 81 is used between the non-vitiated compressed air heater 62 and the combustor 22 that is to be tested. The heater 81 would be a high enthalpy heater. The FIG. 14 embodiment is used to test a combustor or other component at a high Mach number by further increasing the inlet temperature of the non-vitiated compressed air and thus simulate the conditions at an inlet to a component of an aircraft traveling at a high Mach number.

Figure 15:
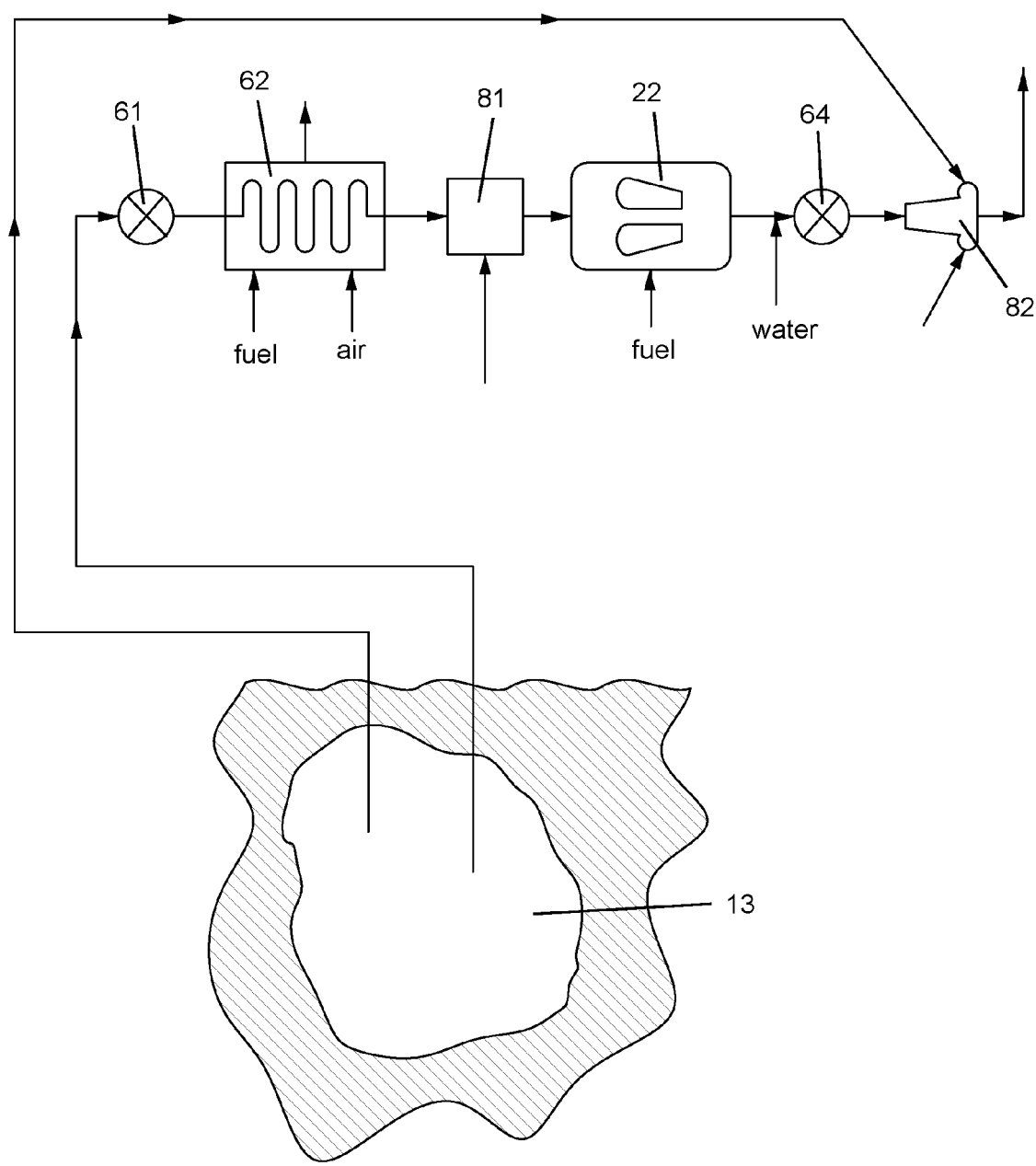
FIG. 15 shows another embodiment of the present invention in which a test facility can test a component such as a combustor at high altitude where the pressure of the air is low.

In FIG. 15, another embodiment of the present invention shows a test facility that can test a component such as a combustor at high altitude where the ambient outside pressure of the air is low. The FIG. 15 test facility is similar to the FIG. 14 test facility, but with the addition of an ejector 82 positioned downstream from the test article such as the combustor 22. The combustor 22 would discharge into a low pressure atmosphere at high altitude and thus the discharge pressure for testing should also be low. The ejector is supplied with compressed air from the storage reservoir 13 that is discharged into the exhaust gas from the combustor 22 and decreases the pressure. The ejector 82 functions like a jet pump in that a first gas is discharged into a second gas and pulls the second gas forward, resulting in the inlet of the second gas to decrease in pressure. The non-vitiated compressed air is delivered to the combustor 22 and burned with a fuel to produce a hot gas stream that is exhausted from the combustor. The compressed air from the storage reservoir 13 is discharged into the combustor exhaust gas to decrease the pressure and thus simulate the combustor conditions at high altitude.

Figure 16:
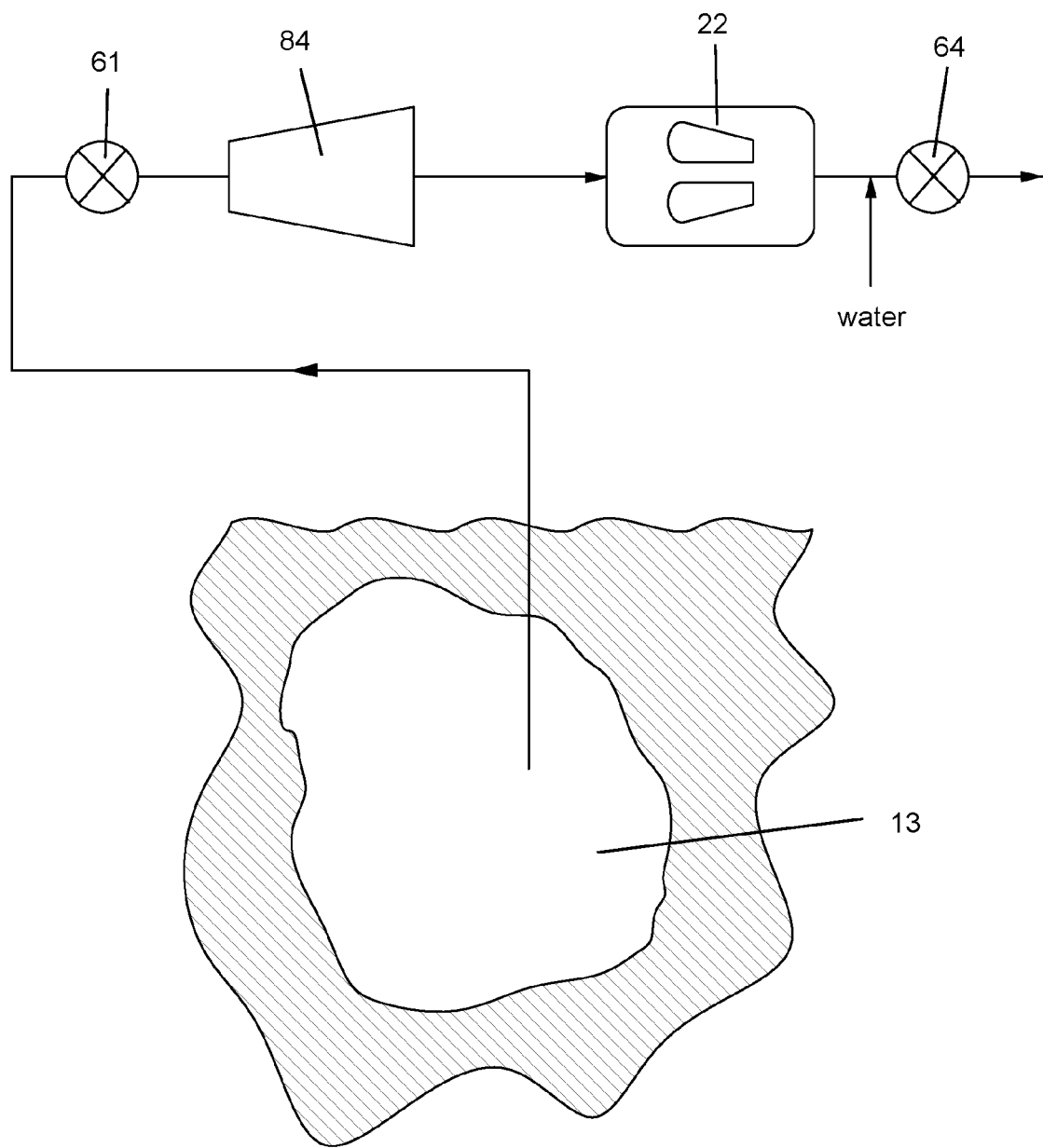
FIG. 16 shows another embodiment of the present invention in which the test facility is used to test a component such as a combustor at a cold environment.

In FIG. 16, the test facility is used to test a component such as a combustor at a cold environment. Compressed air from the storage reservoir 13 is delivered to an air turbine 84 that will discharge the compressed air at lower temperature into a combustor 22 that is then burned with a fuel to test the combustor under cold conditions at inlet. A flow regulator valve 61 controls the pressure and flow into the air turbine 84. In an air turbine, no combustion occurs, only a decrease in the pressure and temperature of the air. In an example, compressed air enters the air turbine at 30 degrees C. and is discharged at −120 degrees C.

Figure 17:
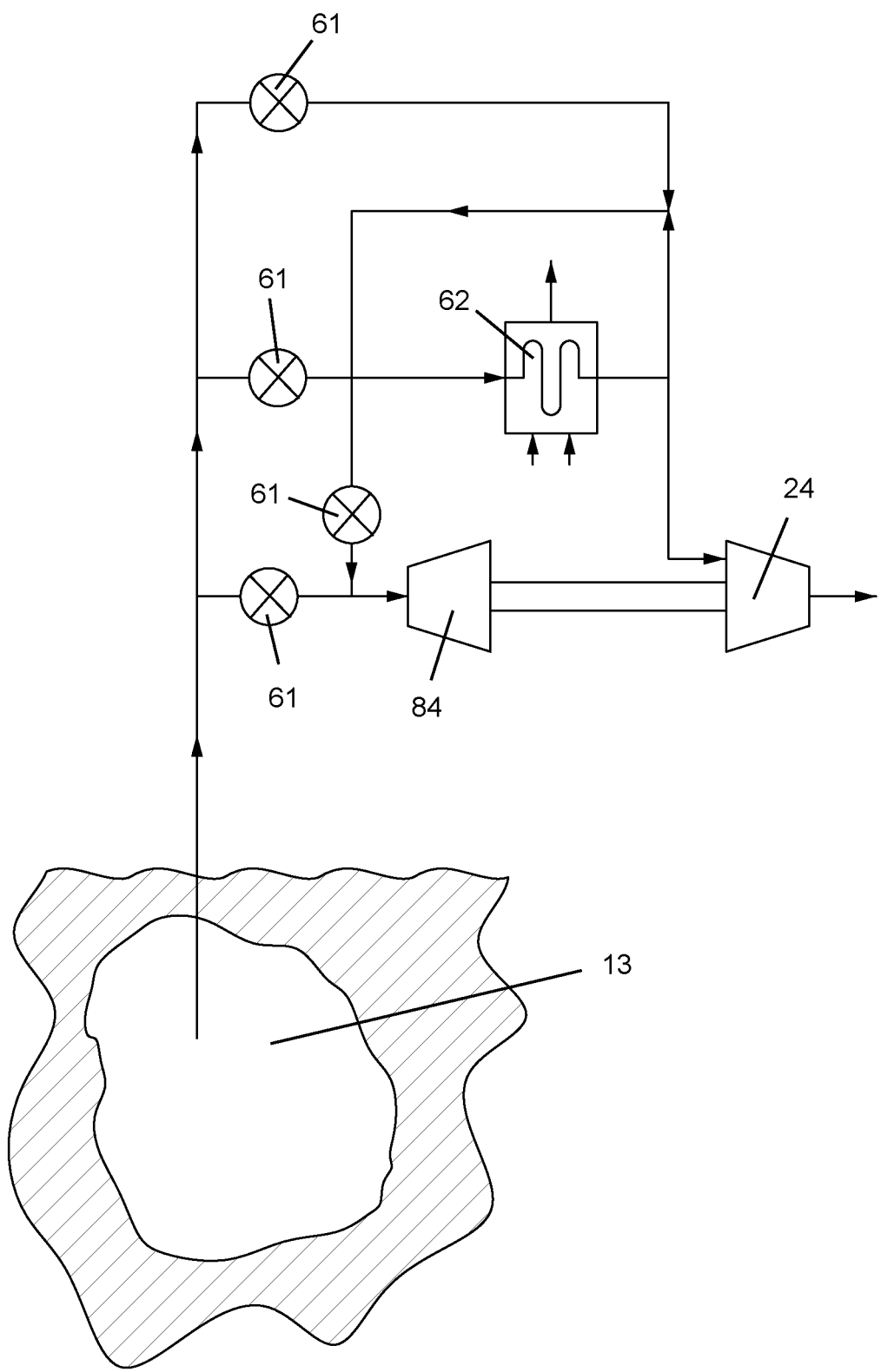
FIG. 17 shows another embodiment of the present invention in which the test facility is used to test a compressor under normal operating conditions.

In FIG. 17, the test facility is used to test a compressor under normal operating conditions. Compressed air from the storage reservoir 13 is delivered to a non-vitiated heater 62 to increase the temperature of the compressed air to a normal inlet temperature for the compressor being tested. Compressed air from the storage reservoir 13 is also delivered to an air turbine 84 that is used to drive the compressor 24 being tested. Pressure regulator valves 61 are used to control compressed air flows into the heater 62 and the air turbine 84. An advantage of the FIG. 17 test facility is quick on and off control which results in little to no upset of the electrical grid. Also, large compressors can be tested with full scale operation. A bypass line with a pressure regulator valve 61 from the storage reservoir 13 to an inlet of the compressor 24 can be used to vary an inlet pressure or temperature of the air into the compressor 24 to test for varying inlet conditions.

Figure 18:
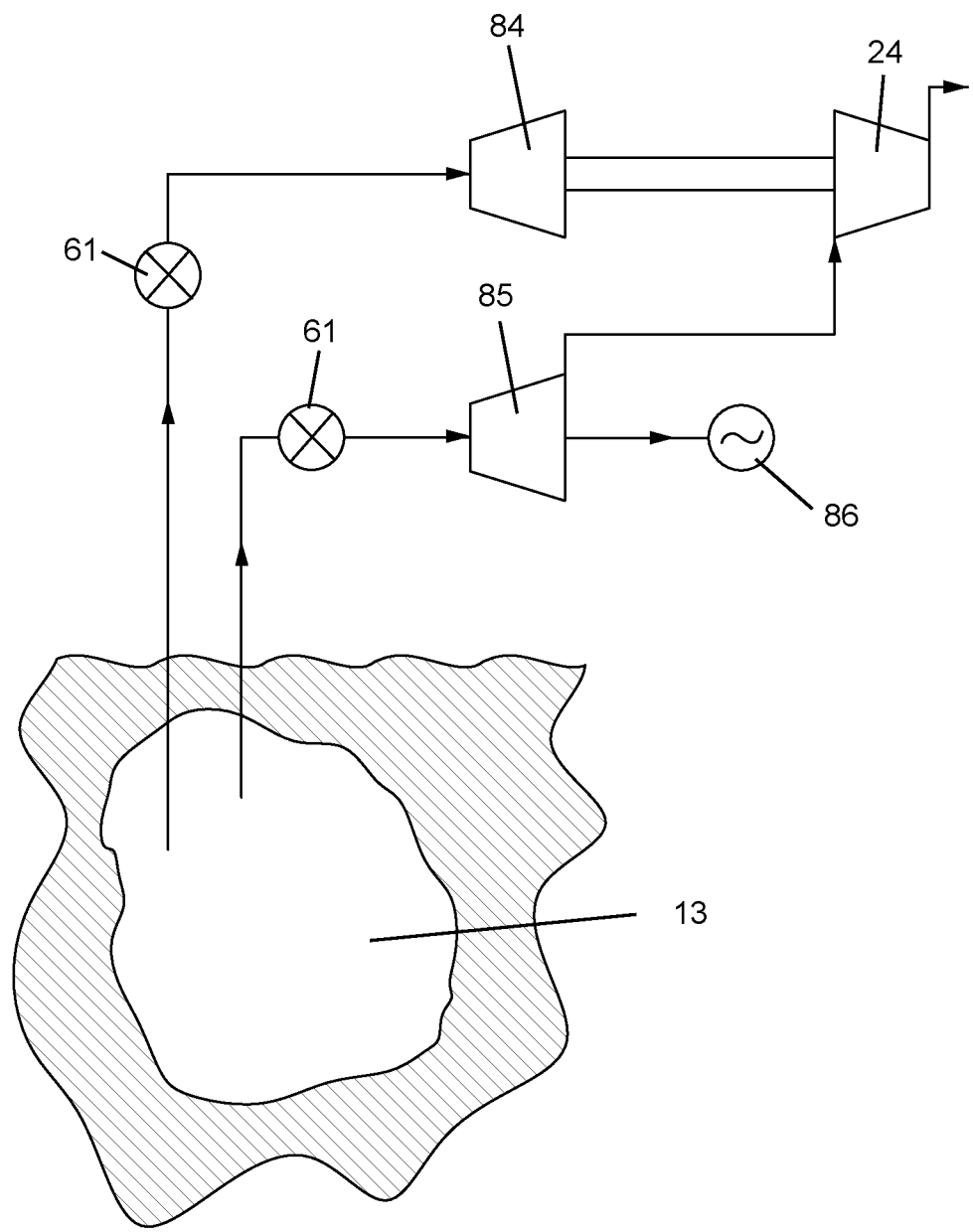
FIG. 18 shows another embodiment of the present invention in which the test facility is used to test a compressor under a cold environment such as high altitude.

In FIG. 18, the test facility is used to test a compressor under a cold environment such as high altitude. The compressor 24 being tested is driven by an air turbine 84 using compressed air from the storage reservoir 13. Compressed air from the storage reservoir 13 is also delivered to a second air turbine 85 that decreases the pressure and temperature of the compressed air that is then delivered to an inlet of the compressor 24 being tested. The second air turbine 85 can drive an electric generator 86 to produce electricity for use elsewhere. The compressed air from the compressor 24 being tested can be delivered back to the storage reservoir 13 or elsewhere for use in another test. In another version of the FIG. 18 embodiment used to test a compressor, the air turbine exhaust could be used as the inlet air into the compressor. This would provide a lower pressure and a lower temperature of inlet air for the compressor 24 being tested while the air turbine 84 is still used to drive the compressor 24.

Figure 19:
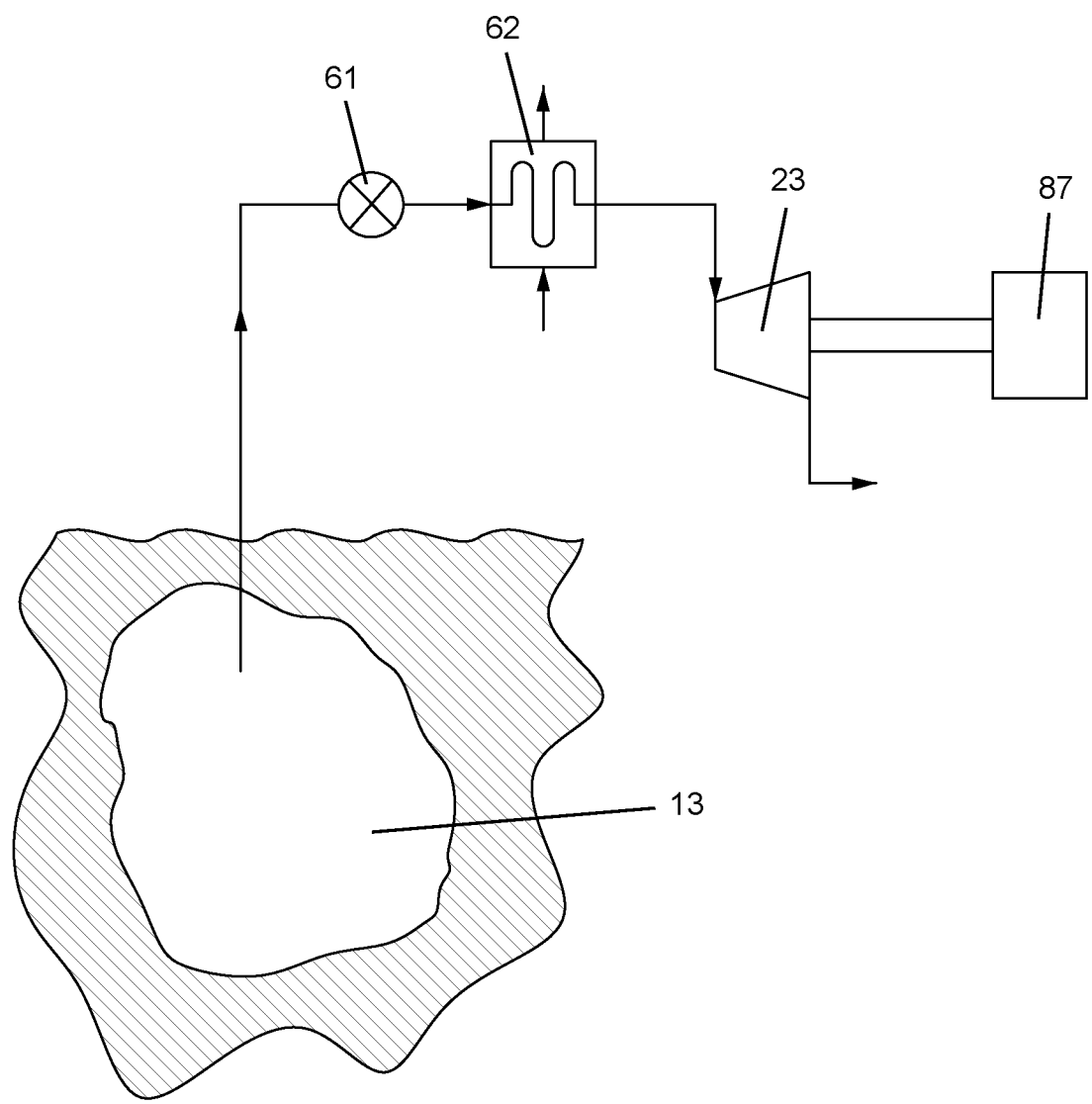
FIG. 19 shows another embodiment of the present invention in which the test facility is used to test a turbine under warm air conditions.

In FIG. 19, the test facility is used to test a turbine under warm air conditions. Compressed air from the storage reservoir 13 is delivered to a non-vitiated heater 62 to increase the temperature of the compressed air to a warm condition and passed through the turbine 23 without burning a fuel. The heater 62 can be a non-vitiated heater or a duct burner. The warm compressed air can be used to test the turbine 23 for aerodynamic and cooling data. The turbine 23 can drive a load 87 such as a compressor or a generator.

Figure 20:
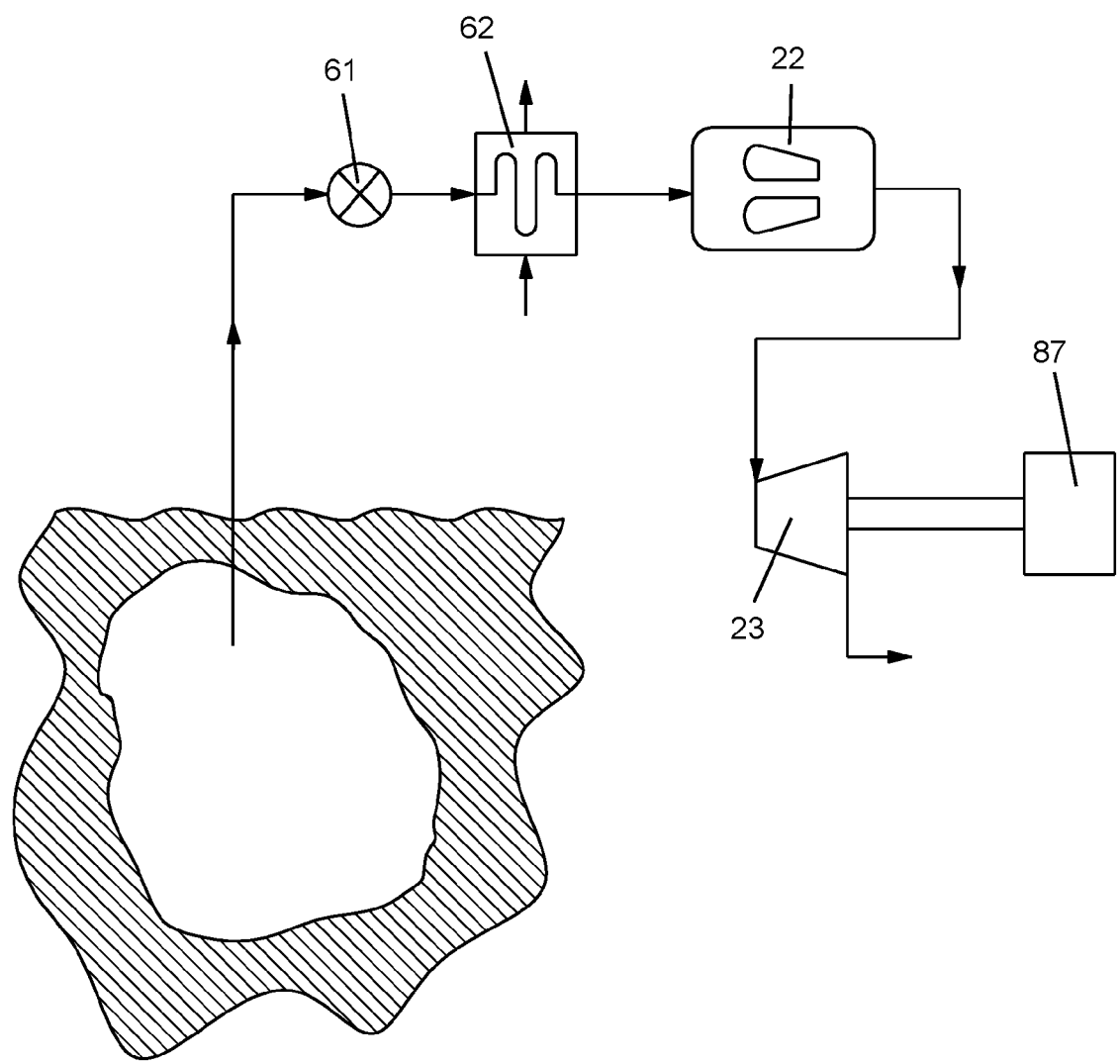
FIG. 20 shows another embodiment of the present invention in which the test facility is used to test a combustor at full load conditions.

The test facility is FIG. 20 is used to test a combustor at full load conditions. Compressed air from the storage reservoir 13 is delivered to a non-vitiated heater 62 to increase the temperature of the compressed air to simulate the conditions that would be discharged from a compressor sized for the combustor that is being tested. Fuel and air are burned to produce heat that is then used to heat up the compressed air within affecting the oxygen content. The preheated compressed air is then delivered to the combustor 22 where the air is burned with a fuel to produce a hot gas that is discharged to the turbine 23 that is being tested. The turbine 23 can drive a load 87 such as a compressor or a generator. A large industrial engine turbine can be tested at full load conditions for many hours using this test facility.

Figure 21:
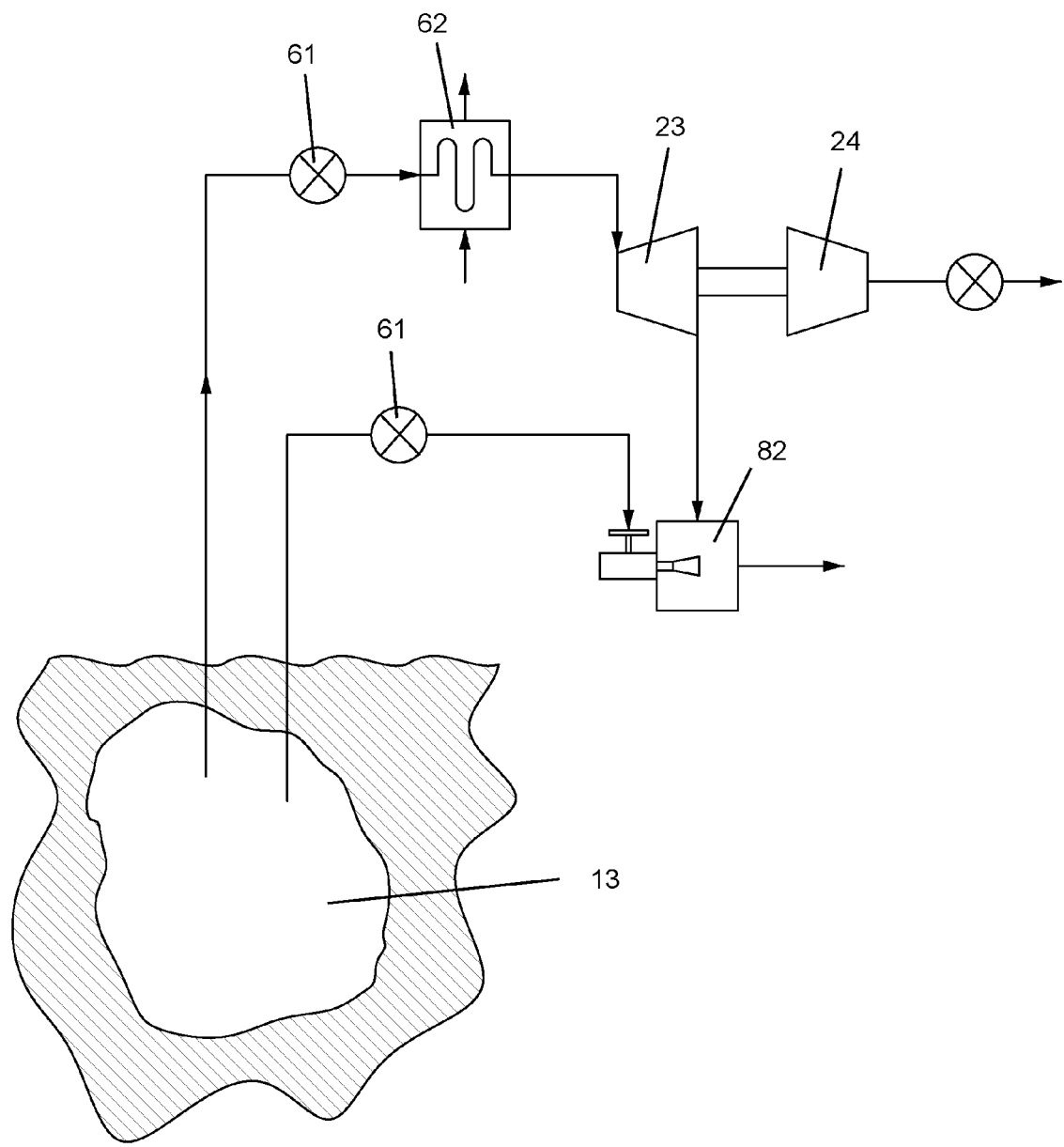
FIG. 21 shows another embodiment of the present invention in which the test facility is used to test a turbine at high altitude conditions.
Figure 22:
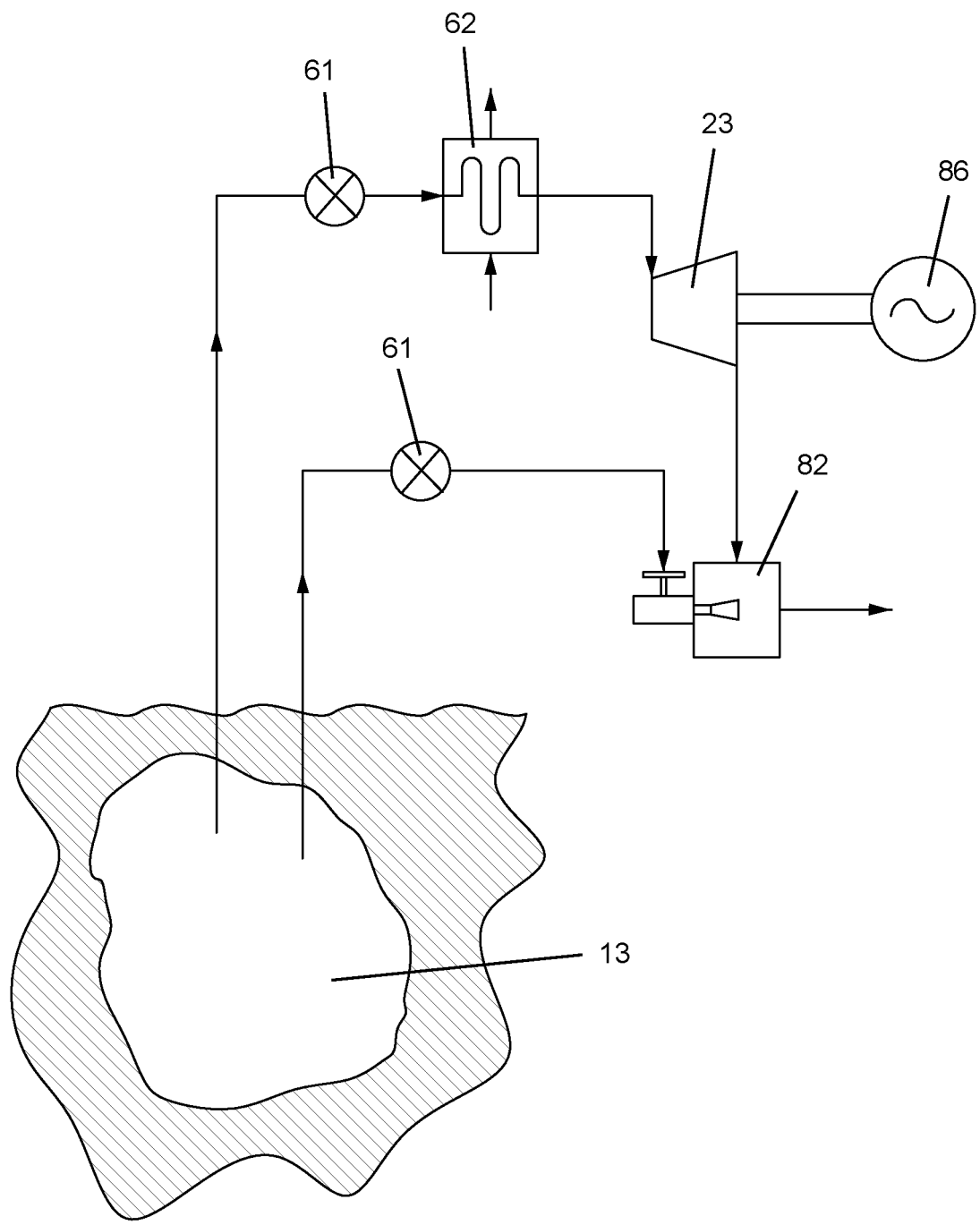
FIG. 22 shows another embodiment of the present invention in which the facility is used to testing a turbine at high altitude conditions where the turbine drives a generator as the load.

FIG. 21 shows a test facility for testing a turbine at high altitude conditions. Compressed air from the storage reservoir 13 is heated through a non-vitiated heater 62 and then passed through the gas turbine 23 that is being tested. Compressed air from the storage reservoir 13 is also delivered to an ejector 82 that lowers an outlet pressure of the turbine 23 exhaust to simulate high altitude conditions on the discharge end of the turbine 23. The turbine 23 can drive a load such as a compressor 24 or a generator. At high altitude, the air has a lower Reynold's number and thus can cause separation in the low pressure turbine. Thus, testing can in the facility of FIG. 21 can improve the design of the turbine at high altitudes. FIG. 22 shows a facility for testing a turbine at high altitude conditions where the turbine 23 drives a generator 86 as the load.

Figure 23:
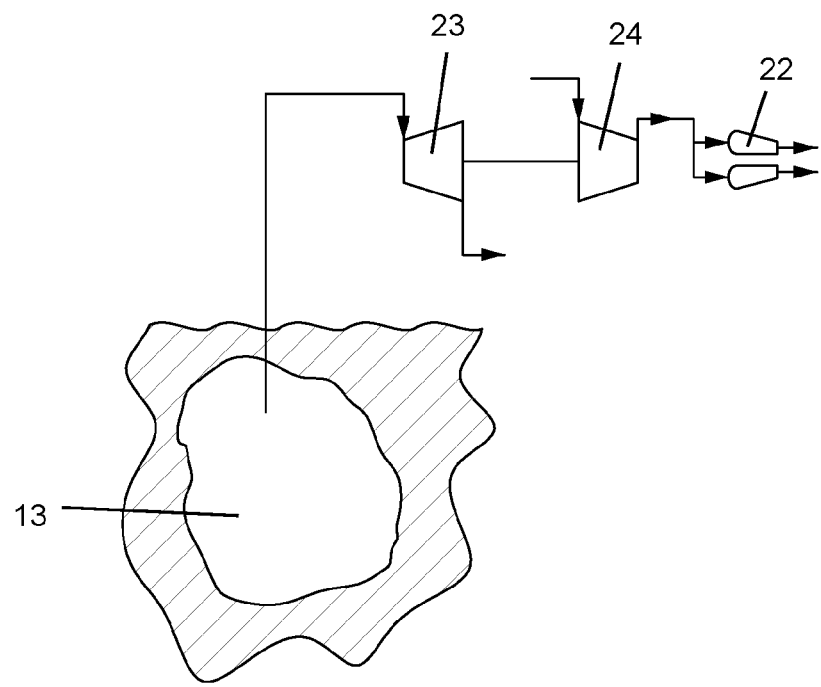
FIG. 23 shows another embodiment of the present invention in which an air turbine is used to drive a compressor to produce high pressure and high temperature compressed air for test of a combustor.
Figure 24:
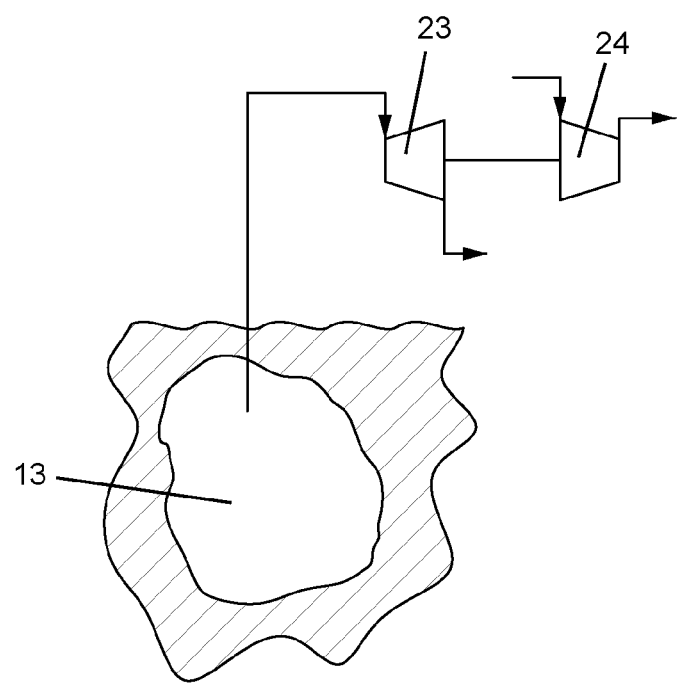
FIG. 24 shows another embodiment of the present invention in which an air turbine is used to drive a compressor for testing of a compressor.

In the FIG. 23 embodiment, a non-vitiating heater can be eliminated from the combustor testing option. Compressed air from the reservoir 13 can be supplied to an air turbine 23 that will drive a compressor 24 to produce the proper compressed air with the pressure and temperature required for discharge into the combustor 22 that is to be tested. Thus, the high pressure and high temperature compressed air is produced from an actual compressor that is sized for use with the combustor 22 that is to be tested. In the FIG. 24 embodiment, the air turbine 23 is used to drive a compressor 24 that is being tested.

Figure 25:
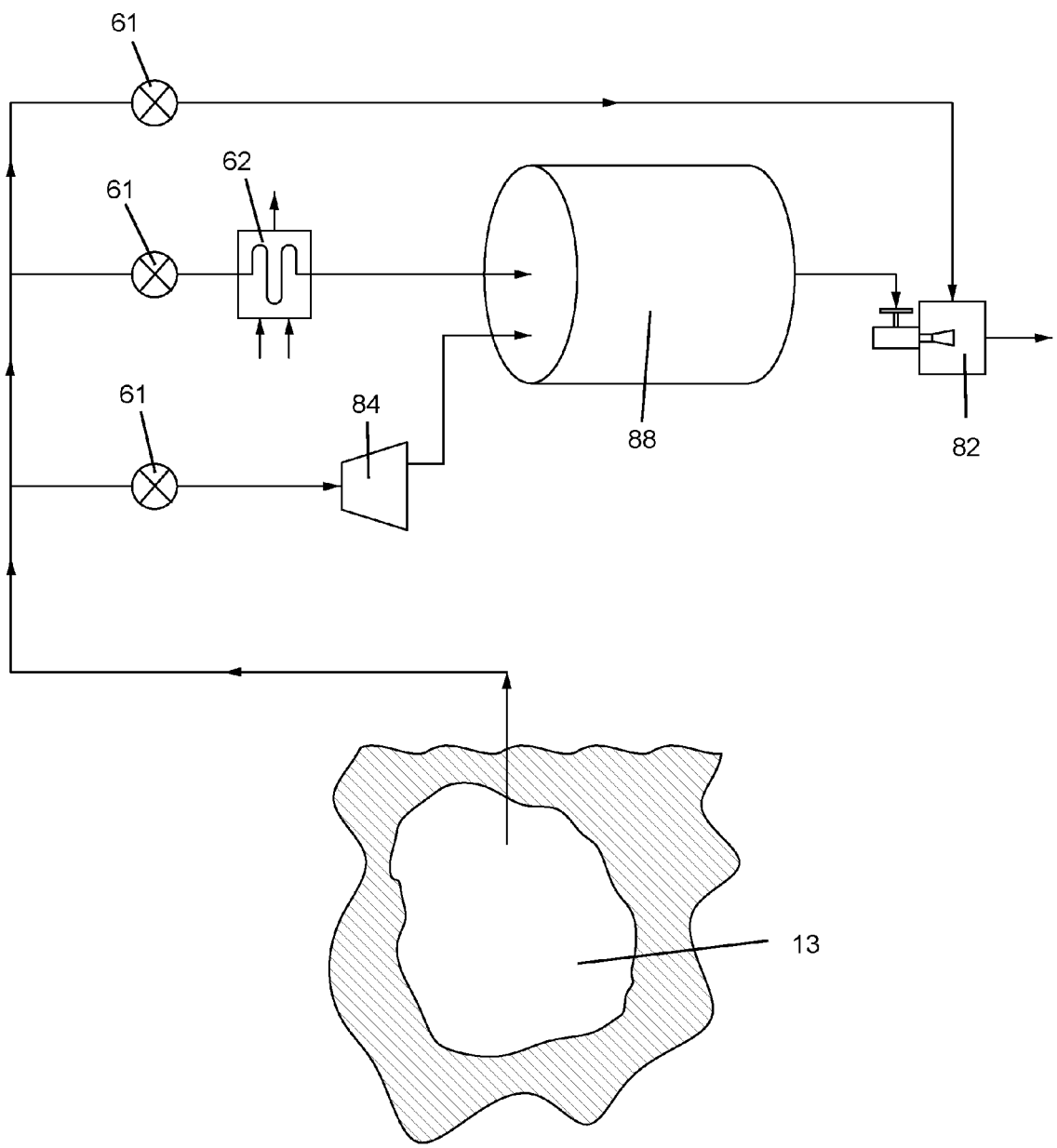
FIG. 25 shows another embodiment of the present invention in which the test facility is used to test a component such as a full-sized aircraft in a wind tunnel.

The test facility shown in FIG. 25 is used to test a component such as a full-sized aircraft in a wind tunnel. A component to be tested is secured within a wind tunnel 88. Compressed air from the storage reservoir 13 can be passed through a non-vitiated heater 62 to increase the temperature of the compressed air delivered to the wind tunnel 88, or compressed air from the storage reservoir 13 can be passed through an air turbine 84 to decrease the temperature of the compressed air for delivery to the wind tunnel 88. The air turbine 84 could be replaced with a throttling valve that would lower the pressure and temperature of the compressed air from the storage reservoir 13. Compressed air from the storage reservoir 13 can also be delivered to an ejector 82 located downstream from the wind tunnel 88 to decrease the exit pressure at the wind tunnel 88. The ejector 82 functions to decrease the pressure of the air at the discharge end of the wind tunnel 88. With the ejector 82 at the discharge end of the wind tunnel 88, very high Mach number tests can be done on a component and for long periods of time compared to that available in the prior art. The huge amount of compressed air available within the storage reservoir 13 can be used to supply a large volume of compressed air to the wind tunnel. With the test facility of FIG. 23, a vehicle can be tested at full scale and at high Mach numbers (Mach 5 to Mach 10) and for hours and not seconds as is the current conditions of the prior art.

Figure 26:
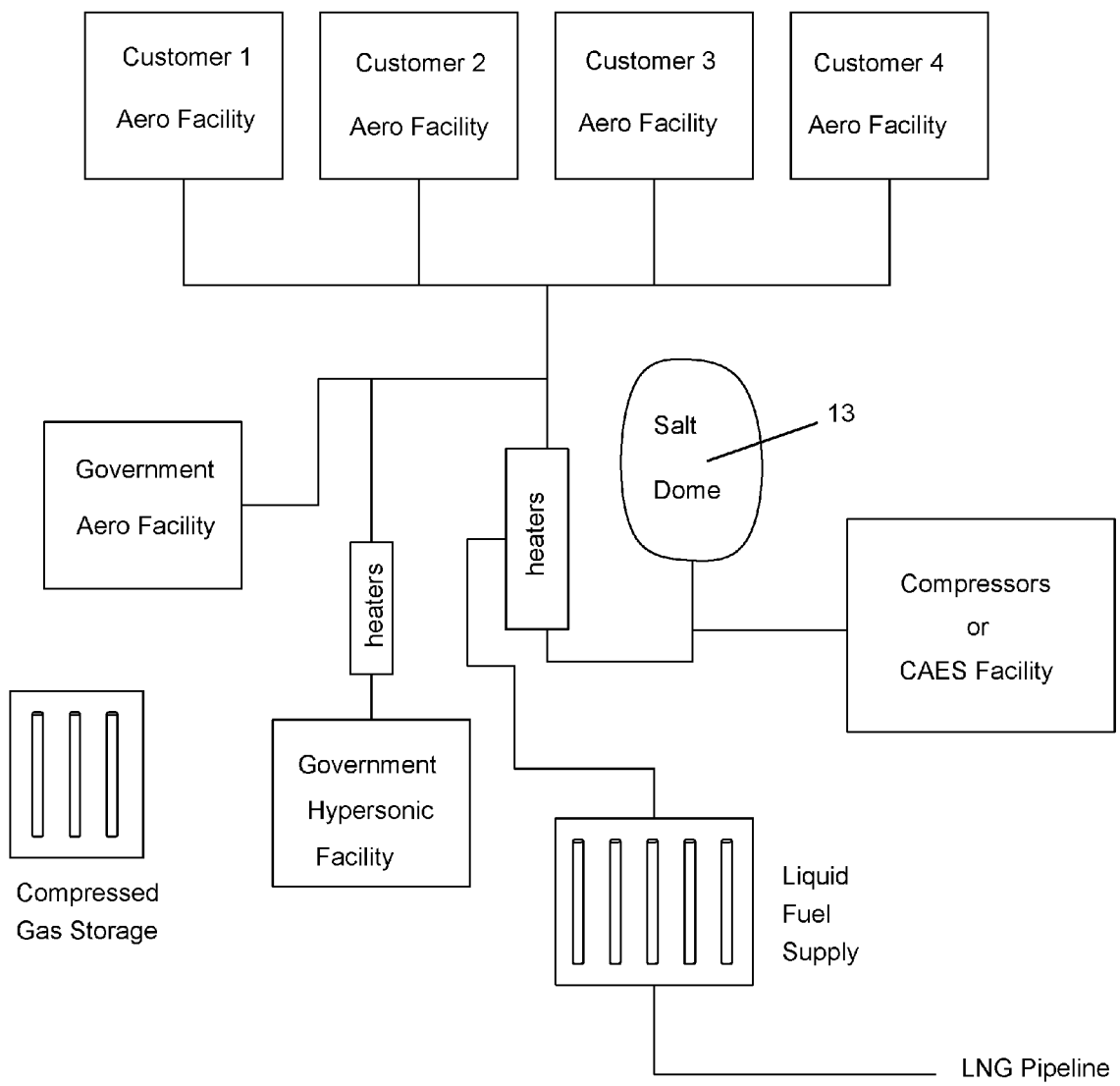
FIG. 26 shows a test facility according to one embodiment of the present invention using a storage reservoir such as an underground salt dome to provide long duration, full scale combustor, augmenter, and hypersonic propulsion system tests.

FIG. 26 shows a test facility using a storage reservoir such as an underground salt dome to provide long duration, full scale combustor, augmenter, and hypersonic propulsion system tests. The benefits to this test facility over the existing prior art text facilities is a 10 hour test time versus around 60 seconds test time in the prior art. Also, lower operating costs are possible due to night-time electric rates and zero electric demand charges. A significantly lower capital cost is achieved due to a compression system cost reduced by 80% and a power infrastructure reduced. The test facility of the present invention can provide for aero testing with a nominal flow rate of 500 lbs/second at a pressure of 1,100 psi and a temperature of 1,450 degrees F. the test facility of the present invention can provide for hyper testing with a nominal flow rate of 1,000 lbs/second at a pressure of 2,800 psi and a temperature of 2,050 degrees F.

Figure 27:
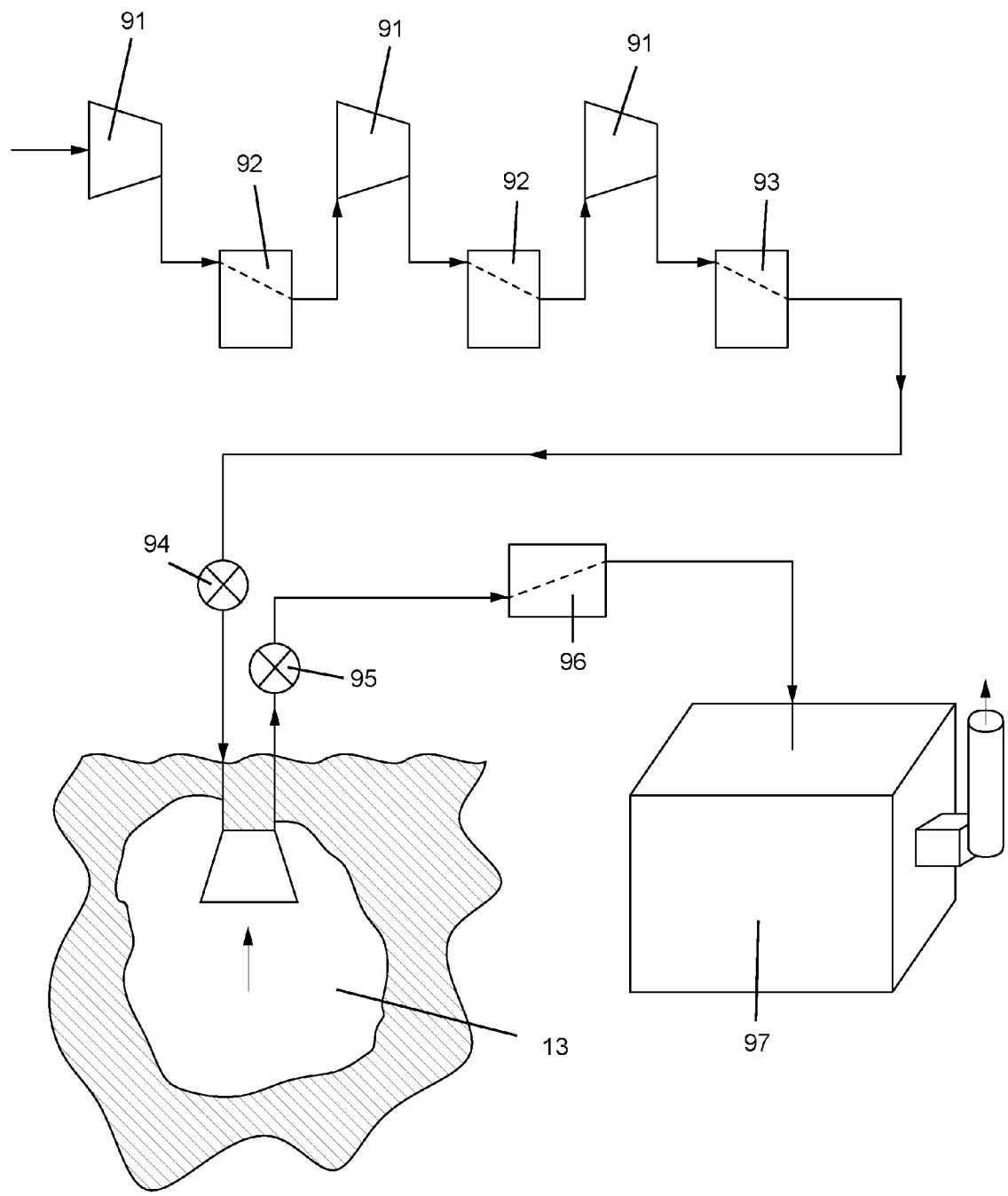
FIG. 27 shows a CAES (Compressed Air Energy Storage) test facility of the present invention with a cave fill process that includes a number of compressors and intercoolers and an after-cooler formed in series flow that discharges into the cavern.

FIG. 27 shows a CAES (Compressed Air Energy Storage) test facility of the present invention with a cave fill process that includes a number of compressors 91 and intercoolers 92 and an after cooler 93 formed in series flow that discharges into the cavern 13. The intercoolers 92 and the after cooler 93 decrease the compressor 91 exit temperatures. Control valves 94 and 95 regulate the flow into and out of the cavern 13. An externally fired heat exchanger 96 increases the temperature of the compressed air form the cavern 13 and delivers the heated compressed air to the test cell 97. Hypersonic and aerospace testing can be achieved with large volumes of compressed air and at much longer periods of testing than is available in the current prior art test facilities.

We claim the following:

1. A process for testing a combustor of a gas turbine engine under low atmospheric conditions comprising the steps of:

filling an underground storage reservoir with compressed air;

securing a combustor to be tested on a test stand;

passing compressed air from the underground storage reservoir through a heater to increase a temperature of the compressed air;

passing the heated compressed air into a combustor for testing;

burning a fuel with the heated compressed air within the combustor; and, passing additional compressed air from the underground storage reservoir into an ejector located downstream of the combustor to decrease a pressure at an exhaust of the combustor to simulate a low atmospheric condition.

2. The process for testing a combustor of a gas turbine engine under low atmospheric conditions of claim 1, and further comprising the step of:

the step of heating the compressed air from the underground storage reservoir includes heating the compressed air without decreasing an oxygen level of the compressed air.

\* \* \* \* \*